US012674276B2

(12) United States Patent
Arangdad et al.

(10) Patent No.: US 12,674,276 B2
(45) **Date of Patent: *Jul. 7, 2026**

(54) FLUID RESISTANT TREATMENT AND GARMENTS TREATED THEREWITH

(71) Applicant: Burlington Industries LLC, Charlotte, NC (US)

(72) Inventors: Kiarash Arangdad, Cary, NC (US); William J. Dilanni, Kernersville, NC (US)

(73) Assignee: Burlington Industries LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,000

(22) Filed: Aug. 27, 2024

(65) Prior Publication Data

US 2025/0073507 A1 Mar. 6, 2025

Related U.S. Application Data

(60) Provisional application No. 63/535,632, filed on Aug. 31, 2023.

(51) Int. Cl.

| | |
|---|---|
| ***D06N 3/00*** | (2006.01) |
| ***C08K 5/00*** | (2006.01) |
| ***D03D 15/513*** | (2021.01) |
| ***D06M 15/356*** | (2006.01) |
| ***D06N 3/04*** | (2006.01) |

(52) U.S. Cl.

CPC ......... *D06N 3/0002* (2013.01); *C08K 5/0025* (2013.01); *D03D 15/513* (2021.01); *D06M 15/3568* (2013.01); *D06N 3/042* (2013.01); *C08K 2201/019* (2013.01); *D06M 2200/11* (2013.01); *D06M 2200/12* (2013.01); *D06N 2203/041* (2013.01); *D06N 2203/061* (2013.01); *D06N 2209/142* (2013.01); *D06N 2209/145* (2013.01); *D06N 2211/10* (2013.01)

(58) Field of Classification Search

None

See application file for complete search history.

(56) References Cited

U.S. PATENT DOCUMENTS

| | | | |
|---|---|---|---|
| 5,145,907 | A | 9/1992 | Kalinowski et al. |
| 9,266,263 | B1 | 2/2016 | Jaeger |
| 2020/0332148 | A1 | 10/2020 | Gotou et al. |

(Continued)

FOREIGN PATENT DOCUMENTS

| | | | |
|---|---|---|---|
| CN | 109763345 | A | 5/2019 |
| WO | WO 2022/232690 | A1 | 11/2022 |

OTHER PUBLICATIONS

Lei et al., "Fluorine-free low surface energy organic coating for anti-stain applications", Progress in Organic Coatings, 2017, vol. 103, pp. 182-192.

(Continued)

*Primary Examiner* — Arti Singh-Pandey
(74) *Attorney, Agent, or Firm* — Dority & Manning, P.A.

(57) ABSTRACT

In one aspect, fabric materials are disclosed that have been treated with a fluid resistant treatment containing a water resistant composition and an oil resistant composition. The fluid resistant treatment may be substantially fluorocarbon free. Fire service garments can be made from the fabric materials that provide resistance to water and/or oil.

19 Claims, 5 Drawing Sheets

(56) References Cited

U.S. PATENT DOCUMENTS

| | | | |
|---|---|---|---|
| 2020/0360735 | A1 | 11/2020 | Cantin et al. |
| 2022/0074128 | A1 | 3/2022 | Lalgudi et al. |
| 2022/0087348 | A1 | 3/2022 | Terry et al. |
| 2023/0038369 | A1 | 2/2023 | Qi et al. |
| 2023/0276880 | A1 | 9/2023 | Arangdad et al. |
| 2025/0072535 | A1* | 3/2025 | Arangdad ......... D06M 15/3568 |

OTHER PUBLICATIONS

International Search Report and Written Opinion for PCT/US2024/043997, dated Dec. 3, 2024, 8 pages.

* cited by examiner

STANDARD SPRAY TEST RATINGS 100 (ISO 5)

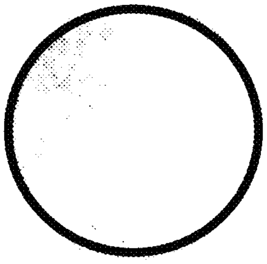

FIG. 3A 90 (ISO 4)

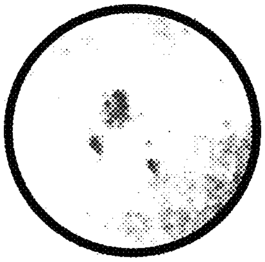

FIG. 3B 80 (ISO3)

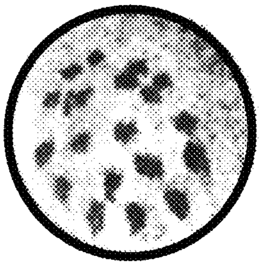

FIG. 3C 70 (ISO 2)

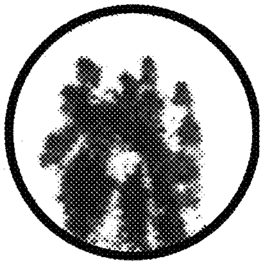

FIG. 3D 50 (ISO 1)

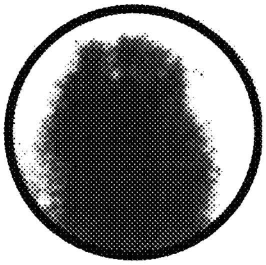

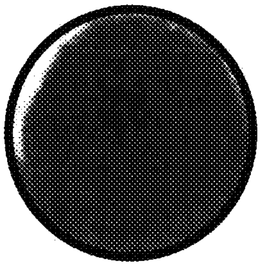

FIG. 3F

100 – NO STICKING OR WETTING OF THE SPECIMEN FACE

90 – SLIGHT RANDOM STICKING OR WETTING OF THE SPECIMEN FACE

80 – WETTING OF SPECIMEN FACE AT SPRAY POINTS

70 – PARTIAL WETTING OF THE SPECIMEN FACE BEYOND THE SPRAY POINTS

50 – COMPLETE WETTING OF THE ENTIRE SPECIMEN FACE BEYOND THE SPRAY POINTS

0 – COMPLETE WETTING OF THE ENTIRE FACE OF THE SPECIMEN

A: Passes; clear, well-rounded drop
B: Borderline pass; rounding drop with partial darkening
C: Fails; wicking apparent and/or complete wetting
D: Fails; complete wetting

FLUID RESISTANT TREATMENT AND GARMENTS TREATED THEREWITH

RELATED APPLICATIONS

The present application is based upon and claims priority to U.S. Provisional Patent Application Ser. No. 63/535,632, having a filing date of Aug. 31, 2023, which is incorporated herein by reference in its entirety.

BACKGROUND

Various different types of protective garments exist that are intended to provide protection to the wearer. In certain embodiments, for instance, the protective garments are designed to provide protection from liquids, such as water and/or oil. Such protective garments, for instance, are typically worn by firefighters.

Notably, the absorbing and retaining of moisture and/or oil may result in detrimental effects to both the garment and the wearer, such as a firefighter. For instance, if the garment retains moisture, the protective garment can become significantly heavier and/or affect the thermal properties of the garment making the garment less effective in shielding its wearer from thermal heat. Additionally, for instance, if the garment absorbs and/or retains oil, the protective garment may have reduced breathability, reduced chemical resistance, and/or may be subject to staining. Thus, water repellency and oil repellency are important considerations in garment and fabric material treatments.

In the past, treatments utilized to provide water repellency and/or oil repellency have contained fluorocarbon chemicals. In general, fluorocarbon chemicals are durable and provide for adequate water resistance and oil resistance. Recently, however, various manufacturers, including fabric makers, have been placed under increased pressure to reduce the amount of fluorocarbons incorporated into products. Fluorocarbons, for instance, do not readily biodegrade and can remain in landfills for many years to come. In addition, the manufacture and handling of fluorocarbons has been subject to greater scrutiny and governmental regulation.

Thus, a need currently exists for a water and oil resistant composition or treatment that can be applied to protective garments, that is free or substantially free of fluorocarbon chemicals, and that provides water resistant properties and oil resistant properties. More particularly, a need exists for a durable water and oil resistant composition or treatment that is substantially or essentially free of fluorocarbon chemicals and that is capable of being applied to all different types of garments and garment layers, such as turnout gear utilized by firefighters.

SUMMARY

In general, the present disclosure is directed to protective garments that can provide barrier protection against all different types of fluids, including water and oil. The present disclosure is also directed to protective garments that are substantially fluorocarbon free. In addition, the present disclosure is directed to a fabric material that is used to produce the protective garments described above.

In one aspect, the present disclosure is directed to a protective garment comprising: a fabric material comprising a woven fabric, a knitted fabric, a nonwoven fabric, or a combination thereof, the fabric material being treated with a fluid resistant treatment, the fluid resistant treatment impregnating the fabric material, the fluid resistant treatment being substantially fluorocarbon free, the fluid resistant treatment comprising a water resistant composition and an oil resistant composition, the oil resistant composition comprising a silicone-containing polymer. Notably, the protective garment may comprise a fire service garment.

The water resistant composition may be present in the fluid resistant treatment in an amount from about 0.05 wt. % to about 40 wt. %. Further, the water resistant composition may comprise an acrylic emulsion and/or may be substantially fluorocarbon free.

The oil resistant composition may be present in the fluid resistant treatment in an amount from about 0.05 wt. % to about 40 wt. %. Further, the oil resistant composition may comprise a cationically stabilized emulsion, may have a pH of from about 2 to about 8, and/or may be substantially fluorocarbon free.

In one aspect, the fluid resistant treatment may comprise one or more wetting agents, wherein the one or more wetting agents comprise isopropyl alcohol. Further, the fluid resistant treatment may comprise one or more cross-linking agents, wherein the one or more cross-linking agents comprise a polyurethane.

In one aspect, the water resistant composition and the one or more wetting agents may be present in the fluid resistant treatment in a weight ratio of about 4:1 to about 40:1. Further, in one aspect, the water resistant composition and the one or more cross-linking agents may be present in the fluid resistant treatment in a weight ratio of about 1:2 to about 15:1.

In one aspect, the oil resistant composition and the one or more wetting agents may be present in the fluid resistant treatment in a weight ratio of about 5:1 to about 50:1. Further, the oil resistant composition and the one or more cross-linking agents may be present in the fluid resistant treatment in a weight ratio of about 1:2 to about 15:1.

Notably, the water resistant composition and the oil resistant composition may be present in the fluid resistant treatment in a weight ratio of about 1:10 to about 10:1.

In one aspect, the oil resistant composition may comprise a cationically stabilized silicone-containing polymer.

In one aspect, the oil resistant composition may comprise one or more pendant groups having the following structure:

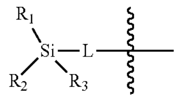

wherein, each of $R_1$, $R_2$, and $R_5$ are independently alkyl groups (e.g., methyl groups, ethyl groups, propyl groups, butyl groups, and/or pentyl groups), alkoxy groups (e.g., methoxy groups and/or ethoxy groups), aryl groups, hydroxyl groups, halogen groups, —O—SiR' groups, —O—SiOR' groups, or combinations thereof, wherein R' groups are independently chosen from alkyl groups (e.g., methyl groups, ethyl groups, propyl groups, butyl groups, and/or pentyl groups) and/or aryl groups;

wherein each L is a linking group comprising alkyl groups, aryl groups, silyl groups, or combinations thereof. In general, the linking group may be a —O— group, a $—CH_2—$ group, a $—(CH_2)_2—$ group, a $—(CH_2)_3—$ group, a $—Si(CH_3)_2O—$ group, a $—OSi(CH_3)_2O—$ group, a $—CH_2CH_{30}—$ group, a $—OSi(CH_2CH_3)_2O—$ group, a $—CH_2O—$ group, a $—(CH_2)$ $_2$O— group, a —$CH_2C$═O— group, a —OC═ONH— group, a —$CH_2N$— group, a —$CH_2SO_2$— group, a

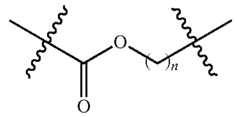

group, a

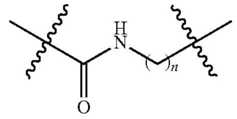

group, a

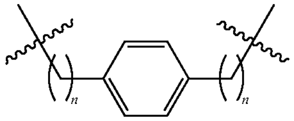

group, where n is a value from 0 to 40.

In one aspect, the oil resistant composition may comprise one or more pendant groups having the following structure:

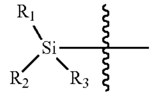

wherein, each of $R_1$, $R_2$, and $R_5$ are independently alkyl groups (e.g., methyl groups, ethyl groups, propyl groups, butyl groups, and/or pentyl groups), alkoxy groups (e.g., methoxy groups and/or ethoxy groups), aryl groups, hydroxyl groups, halogen groups, —O—SiR' groups, —O—SiOR' groups, or combinations thereof, wherein R' groups are independently chosen from alkyl groups (e.g., methyl groups, ethyl groups, propyl groups, butyl groups, and/or pentyl groups) and/or aryl groups.

In one aspect, the present disclosure is directed to a fluid resistant treatment comprising: a water resistant composition; and an oil resistant composition, the oil resistant composition comprising a silicone-containing polymer; wherein the fluid resistant treatment may be substantially fluorocarbon free, wherein the water resistant composition and the oil resistant composition may be present in the fluid resistant treatment in a weight ratio of about 1:10 to about 10:1.

The fluid resistant treatment may comprise one or more wetting agents, wherein the water resistant composition and the one or more wetting agents may be present in the fluid resistant treatment in a weight ratio of about 4:1 to about 40:1, wherein the oil resistant composition and the one or more wetting agents may be present in the fluid resistant treatment in a weight ratio of about 5:1 to about 50:1.

The fluid resistant treatment may comprise one or more cross-linking agents, wherein the water resistant composition and the one or more cross-linking agents may be present in the fluid resistant treatment in a weight ratio of about 1:2 to about 15:1, and wherein the oil resistant composition and the one or more cross-linking agents may be present in the fluid resistant treatment in a weight ratio of about 1:2 to about 15:1.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIGS. 3A-3F are diagrammatical views of illustrated examples of spray ratings for a standardized fabric spray test;

Figure 1:
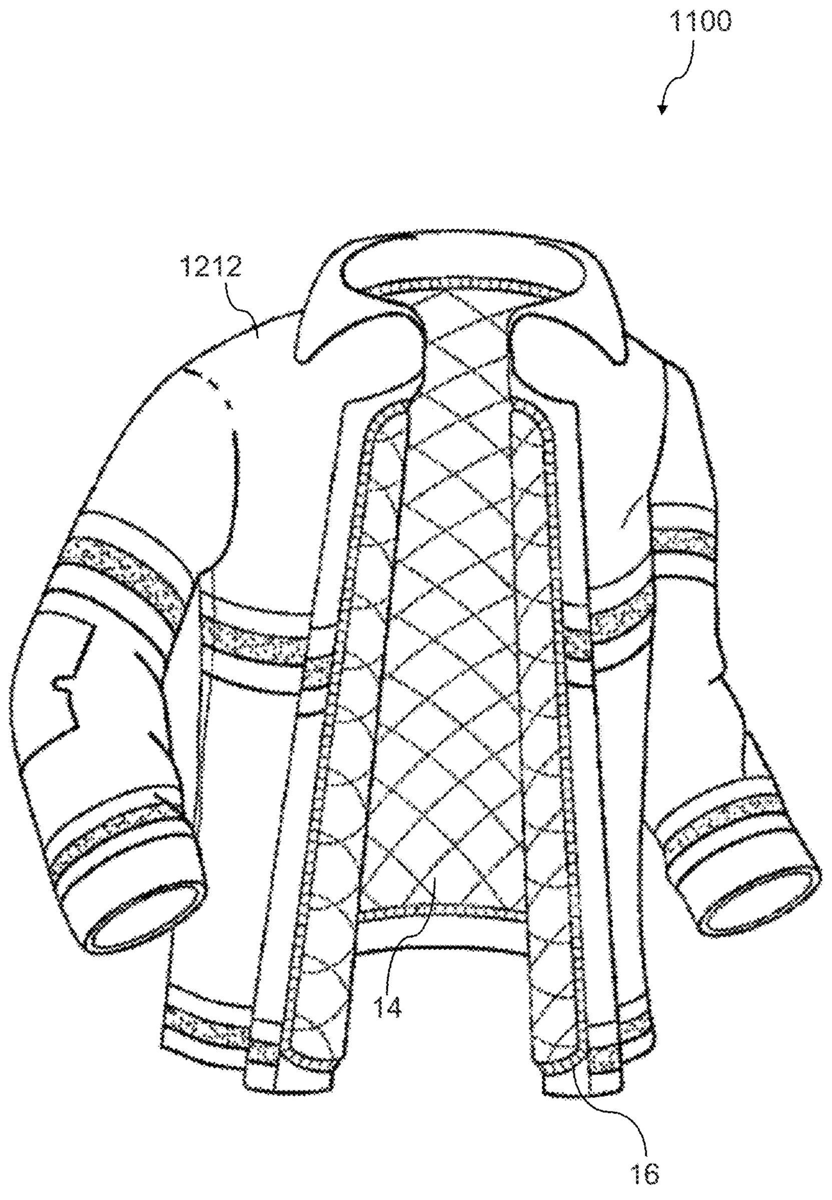
FIG. 1 is a perspective view of one embodiment of a protective garment made in accordance with the present disclosure.

Repeat use of reference characters in the present specification and drawings is intended to represent the same or analogous features or elements of the present invention.

Definitions and Standardized Procedures

The following definitions and procedures are offered in order to better describe and quantify the performance of protective garments and fabrics made according to the present invention in comparison to prior art constructions.

Water Repellency: Spray Test AATCC TM22-2017.

As used herein, a fabric spray rating refers to a rating a fabric or a material receives according to AATCC TM22-2017. In general, a spray test measures the resistance of a material to wetting by water.

According to the present invention, the following is the procedure used to determine the spray rating of a material.

1. A 7"×7" sample of the material to be tested is first conditioned at 65 plus or minus 2% relative humidity and at 70 plus or minus 2° F. for a minimum of four hours prior to testing.

2. The fabric sample is fastened securely on a 6" metal hoop so that the fabric is wrinkle free. The hoop is supported on a tester's stand so that the fabric is facing up. Twills, gabardines, piques or similar fabrics of ribbed construction are positioned on the stand so that the ribs are diagonal to the flow of water running off the fabric. A funnel attached to a nozzle for holding water is placed 6" above the center of the fabric.

3. 250 milliliters of water at 80 plus or minus 2° F. are poured from a cup or other container into the funnel, allowing the water to spray onto the fabric.

4. Once the water has run through the funnel, one edge of the hoop is held and the opposite edge is firmly rapped once against a solid object with the fabric facing the object. The hoop is then rotated 180° and it is rapped once more at the point previously held.

5. The wetted or spotted fabric sample is then compared with the standards shown in FIGS. 3A-3F. The fabric is assigned a spray rating that corresponds to the nearest standard. As shown on FIGS. 3A-3F, the fabric can be rated from 0 to 100 wherein 0 indicates that the entire fabric is wetted with the water, while a rating of 100 indicates that none of the fabric was wetted by the water.

Aqueous Liquid Repellency: Water/Alcohol Solution Resistance Test (AATCC TM193-2017)

The following standardized water repellency test determines a material's resistance to wetting by aqueous liquids. In general, drops of a water-alcohol mixture of varying surface tensions are placed on the surface of the material and the extent of surface wetting is determined visually. The higher the rating a material receives is an indication of the material's resistance to staining by water-based substances. The composition of standard test liquids is as follows:

TABLE 1

Standard Test Liquids

| Water Repellency Rating Number | Composition Isopropanol, % | Composition Distilled Water, % |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |

The water repellency procedure is as follows:

1. An 8"×8" sample of material is first conditioned at 65 plus or minus 2% relative humidity and at 70 plus or minus 2° F. for a minimum of four hours. The fabric is placed horizontally face up on white blotting paper.

2. Beginning with test liquid number 1, one drop of the liquid is placed at three locations on the material. Each drop placed on the material should be 2" apart.

3. The material is observed for 10 seconds from an approximate 45° angle.

4. If two of the three drops have not wet the fabric or do not show leaking into the fabric, drops of test liquid number 2 are placed on an adjacent site and step number 3 is repeated.

5. This procedure is continued until 2 of the 3 drops have wet or show wicking into the fabric. The water repellency rating is the highest numbered liquid for which 2 of the three drops do not wet or wick into the fabric.

Oil Repellency: Hydrocarbon Resistance Test AATCC TM 118-2020

The following standardized oil repellency test determines a material's resistance to wetting by various different hydrocarbons having various surface tensions. A range of standard test liquids, composed of different hydrocarbons with varying surface tensions, are carefully placed on the fabric surface. The behavior of these liquids on the fabric is observed, focusing on wetting, wicking, and the contact angle. The results are reported as a numerical grade ranging from 8 (indicating the highest oil repellency) to 0 (indicating the lowest oil repellency). Intermediate grades, known as half-grades, may also be assigned. If the fabric fails to repel the mineral oil test liquid, a grade of zero (0) is given. The composition of standard test liquids is as follows:

| AATCC Oil Repellency Grade | Composition | Melting or Boiling Point Range | N* |
|---|---|---|---|
| 0 | None (does not repel mineral oil) | | |
| 1 | Mineral oil | 174-177° C. | 31.5 |
| 2 | 65:35 mineral oil: n-hexadecane (by volume) | N/A | N/A |
| 3 | n-hexadecane | 17-18° C. | 27.3 |
| 4 | n-tetradecane | 4-6° C. | 26.4 |
| 5 | n-dodecane | −10.5-9.0° C. | 24.7 |
| 6 | n-decane | 173-175° C. | 23.5 |
| 7 | n-octane | 124-126° C. | 21.4 |
| 8 | n-heptane | 98-99° C. | 19.8 |

*N = dynes/cm at 25° C.

1. An 8"×8" sample of material is conditioned at 65 plus or minus 2% relative humidity and at 70 plus or minus 2° F. for a minimum of four hours before testing. The fabric is placed in a horizontal position face up on white blotting paper.

2. Beginning with liquid number 1, drops approximately 5 milliliters in diameter or 0.05 microliters in volume are placed on the test sample in several locations.

Figure 5:
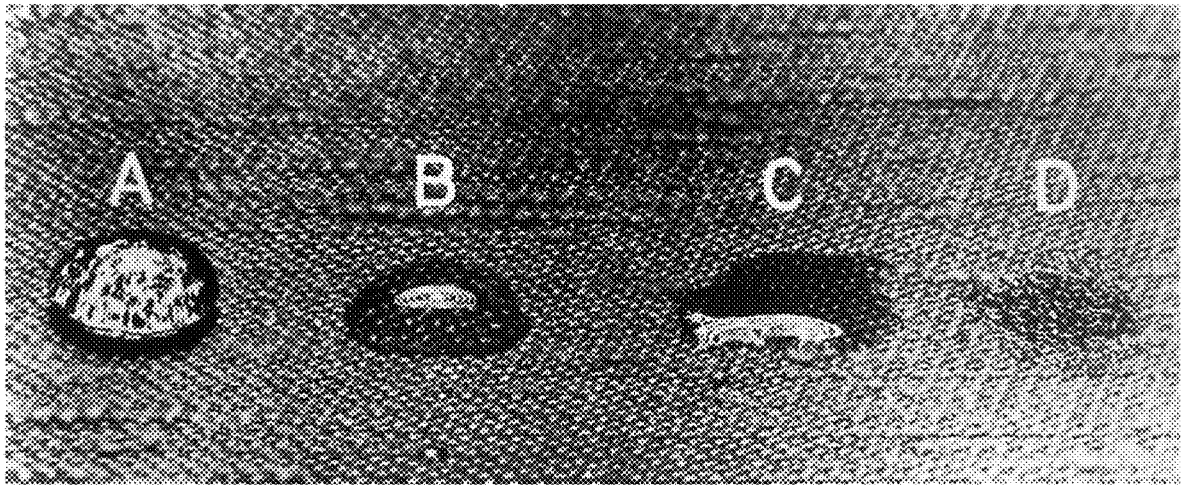
FIG. 5 is an illustrated example of oil repellency categories for a standardized oil repellency test.

3. The drops are observed for 30±2 seconds from an approximate 45° angle. Wetting of the fabric is normally shown by darkening at the liquid/fabric interface. On black or dark fabrics, wetting can be detected by a loss of sparkle within the drop. The wetted or spotted fabric sample may be compared to the categories shown in FIG. 5. An important factor in determining the oil repellency grade is wicking. For instance, if the sample does not exhibit wicking but instead spreads, it is classified as category A, as illustrated in FIG. 5. On the other hand, if the sample exhibits wicking while still maintaining a contact angle, it would fall into category C, as illustrated in FIG. 5.

4. If liquid number 1 does not penetrate or wet the fabric or show wicking around the drops, drops of liquid number 2 are placed on adjacent portions of the fabric and observed for 30 seconds.

5. This procedure is continued until the fabric shows wetting under or around the drops of test liquid within 30 seconds. A sample's AATCC oil repellency rating is the number of the highest numbered test liquid that will not wet the fabric or show wicking within 30 seconds.

Dimensional Changes of Fabrics after Home Laundering AATCC TM135-2018

Laundering is preferably performed in an automatic washer, followed by drying in an automatic dryer. The following laundering test is used to determine the fabric's ability to withstand laundering. Typically, after laundering, the fabric is then subjected to the above-described spray test, water repellency test, and oil repellency test.

1. 8"×10" test specimens are combined with load fabrics (hemmed pieces of cotton sheeting or 50:50 fabric sheets having a size of 36"×36") to give a total dry load of 4 pounds.

2. The dials on the washer are set as follows:

| | |
|---|---|
| Water Level | High |
| Wash | Cycle Normal, 12 minutes |
| Temperature | Warm Wash, 105° F.; Cold Rinse |

The test pieces and dummy load are placed in the washer and the machine is started. One ounce of TIDE (Proctor & Gamble) detergent is added while the washer is filling with soft water. If the water hardness is greater than 5 ppm, CALGON water softener (Nalco) in the amount specified by the manufacturer is added to soften the water.

3. After the washing is complete, the wet fabric including the dummy load is placed in the automatic dryer. The dryer temperature dial is set to the proper point under high heat to give a maximum vent temperature of from about 155° F. to about 160° F. The time dial is set for “Normal Cycle” for 45 minutes. The machine is started and drying is allowed to continue until the cycle is complete. The above represents one laundry cycle.

4. The fabrics are then rewashed and redried until 10 cycles have been completed. Optionally, the test fabrics can be pressed with a hand iron, or the equivalent, at 280° F. to about 320° F. for 30 seconds on each side with the face side pressed last. The fabrics are then conditioned before testing for water is, repellency, oil repellency, or spray rating. As used herein, water repellency, oil repellency and spray ratings are all determined without ironing the fabric after being laundered, unless otherwise denoted.

Water Absorption Resistance Test

The following water absorption test is for determining the resistance to water absorption of a fabric or material. The test is based upon NFPA 1971-2018, 8-25. In particular, the water absorption test is conducted according to the above-identified test method after the fabric or material has been subjected to five laundry cycles in accordance with NFPA 1971, 8-1.2 (or AATCC TM135-2018-1,V, Ai).

According to the present invention, the following is the procedure used to determine the water absorption rating of a material.

1. Three 8"×8" samples of the material to be tested are subjected to five laundry cycles in accordance with NFPA 1971, 8-1.2. Test method NFPA 1972, 8-1.2 is substantially similar to the laundering test described above. In this test, however, the specimens are conditioned in an atmosphere of 70 plus or minus 2° F. and 65 plus or minus 2% relative humidity before and after being washed. Further, the machine settings and parameters are as follows:

| | |
|---|---|
| water level | normal |
| wash cycle | normal/cotton sturdy |
| wash temperature | 140 + or −5° F. |
| drying cycle | tumble/cotton sturdy |
| detergent | 66 + or −1 g of 1993 AATCC standard Reference Detergent |

2. Each sample is securely mounted, with the coated side of the material up, to embroidery hoops with sufficient tension to ensure a uniformly smooth surface. The hoop is supported on a tester’s stand. The material is positioned so that the direction of the flow of water down the sample shall coincide with the warpwise direction of the sample as placed on the stand. A funnel attached to a nozzle for holding water is placed 24" above the center of the material. The plane of the surface of the sample is placed at a 45° angle with the horizontal.

3. 500 ml of water at a temperature of 80+ or −2° F. are poured quickly into the funnel and allowed to spray onto the specimen.

4. As rapidly as possible, the sample is removed from the hoops and placed between two sheets of blotting paper on a flat horizontal surface. A metal roller approximately 4½" long and weighing 2¼ pounds is rolled quickly forward and back one time over the paper without application of any pressure other than the weight of the roller.

5. A square having dimensions of 4"×4" is cut out of the center of the sample and weighed to the nearest 0.05 grams. Not more than 30 seconds shall elapse between the time the water has ceased flowing through the spray nozzle and the start of the weighing.

6. The same 4"×4" square sample is then left in a conditioning room until it has dried and reached moisture equilibrium with the surrounding atmosphere. The sample is then weighed again.

7. The water absorbed shall be calculated as follows:

$$\text{water absorbtion, percent} = \frac{W - O}{O} \times 100$$

herein W is the weight of the wet sample and O is the weight of the dried sample. The water absorption rating of the sample is the average of the results obtained from the three specimens tested.

Water Repellency: Tumble Jar Dynamic Absorption Test

The following test also measures the water-repellent efficacy of finishes applied to fabrics, because the test subjects the treated fabrics to dynamic conditions similar to those often encountered during actual use. The test conforms to AATCC TM70-2015.

According to the present invention, the following is the procedure used to determine the dynamic water absorption rating of a material.

1. During the test, two specimen sets are tested. Each specimen set consists of five 8"×8" pieces of the material. For each piece that is cut, the corner yarns are removed and, if necessary, a drop of liquid latex or rubber cement is placed at the corners to prevent raveling. Prior to testing, each piece of material is conditioned at 65+ or −2% relative humidity and at 70+ or −2° F. for a minimum of four hours. Blotting paper to be used later is also conditioned.

2. The five pieces of each specimen set are rolled together and weighed to the nearest 0.1 gram.

3. Two liters of distilled water at 80+ or −2° F. is poured into the tumble jar of a dynamic absorption tester. The dynamic absorption tester should consist of a motor driven, 6 liter cylindrical or hexagonal-shaped jar approximately 6" in diameter and 12" in length, mounted to rotate end over end at 55+ or −2 rpm with a constant tangential velocity. The jar may be of glass, corrosion resistant metal, or chemical stoneware.

4. Both specimen sets are placed into the jar and the jar is rotated in the tester for 20 minutes.

5. A piece of one specimen set is then immediately passed through a ringer at a rate of 1" per second with the edge of the piece parallel to the rolls. The piece is sandwiched between two pieces of unused blotter paper and passed through the ringer again. The piece is left sandwiched between the wet blotters. The process is then repeated for the remaining four pieces of the specimen set. The blotters are removed and the five pieces are rolled together, put in a tared plastic container or gallon-sized zippered plastic bag and the wet specimen set is weighed to the nearest 0.1 gram. The mass of the wet specimen set should not be more than twice its dry mass.

6. Step number five is repeated for the second specimen set.

7. The dynamic water absorption for each specimen set is calculated to the nearest 0.1% using the following equation:

$$WA=(W-C)/C\times 100$$

where

WA=water absorbed, percent

W=wet specimen weight, g

C=conditioned specimen weight, g.

8. The dynamic water absorption of the material is determined by averaging together the water absorbed by each of the two specimen sets.

9. According to the present invention, the dynamic water absorption rating of the material can be determined after laundering the samples in accordance with NFPA 1971, 8-1.2. For instance, the samples can be tested after 10 laundry cycles and after 20 laundry cycles to determine the durability of the water resistant coating.

As used herein, the air permeability of a fabric (e.g., coated fabric) is tested according to ASTM Test D737 (2018).

DETAILED DESCRIPTION

Reference will now be made in detail to various aspects of the disclosed subject matter, one or more examples of which are set forth below. Each aspect is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one aspect, may be used in another aspect to yield a still further aspect.

In general, the present disclosure is directed to a protective garment that is particularly well suited to protecting the user from fluids and providing an impenetrable barrier to many liquids. Notably, such a protective garment may be particularly advantageous to firefighters. Particularly, a garment formed in accordance with the present disclosure may have enhanced water resistance and enhanced oil resistance. In accordance with the present disclosure, the protective garments are made from a fabric material that is treated with a fluid resistant treatment. The fluid resistant treatment may comprise a water resistant composition and an oil resistant composition. Further, the fluid resistant treatment may be substantially fluorocarbon free and may be applied as a finish that is impregnated into the fabric material. Generally, the combined properties of the water resistant composition and the oil resistant composition may substantially hinder or prevent the penetration of water and/or oil, such as motor oils and/or vegetable oils (e.g., corn oil). Of particular advantage, treated fabric materials in accordance with the present disclosure also have excellent durability and can display the above properties after multiple laundry cycles.

Protective garments treated in accordance with the present disclosure can be used in all different types of fields and applications. As used herein, a protective garment refers to any article of clothing or article that is worn on the body and it can include any part of a protective ensemble. Notably, the protective garments, for instance, can be used by firefighters. Protective garments can include footwear, trousers, overalls, jackets, coats, shirts, headwear, hoods, gloves, cuffs, suspenders, and the like, which may be one or more components of a turnout gear ensemble. Notably, protective garments treated in accordance with the present disclosure may include bunker gear materials and garments. The bunker gear materials and garments may comprise an outer shell, a moisture barrier, and a thermal liner.

In another aspect, other fabric materials may be treated with the fluid resistant treatment of the present disclosure. For instance, bags or pouches (e.g., first responder bags, trauma bags, airway management bags, oxygen bags, medication bags, medical supply bags, etc.) may be treated with the fluid resistant treatment of the present disclosure.

It should be understood that throughout the entirety of this specification, each numerical value (e.g., weight percentage, concentration) disclosed should be read as modified by the term "about" (unless already expressly so modified) and then read again as not to be so modified. For instance, a value of "100" is to be understood as disclosing "100" and "about 100". Further, it should be understood that throughout the entirety of this specification, when a numerical range (e.g., weight percentage, concentration) is described, any and every amount of the range, including the end points and all amounts therebetween, is disclosed. For instance, a range of "1 to 100", is to be understood as disclosing both a range of "1 to 100 including all amounts therebetween" and a range of "about 1 to about 100 including all amounts therebetween". The amounts therebetween may be separated by any incremental value. Notably, some aspects of the present invention may omit one or more of the features disclosed herein. It should be understood that any concentration values disclosed herein may refer to mass concentration, molar concentration, number concentration, or volume concentration.

In general, the fluid resistant treatment and/or one or more components thereof (e.g., water resistant composition, oil resistant composition) of the present disclosure may be substantially free of fluorocarbon chemicals. Notably, a fabric material and/or garment treated with the fluid resistant treatment and/or one or more components thereof (e.g., water resistant composition, oil resistant composition) may be substantially free of fluorocarbon chemicals. Substantially free, as used herein, indicates that the fabric material, the garment, and/or the fluid resistant treatment and/or one or more components thereof (e.g., a water resistant composition, an oil resistant composition) contain fluorocarbon chemicals in an amount less than about 2% by weight, such as in an amount less than about 1% by weight, such as in an amount less than about 0.5% by weight, such as in an amount less than about 0.25% by weight, such as in an amount less than about 0.1% by weight. Further, for instance, a fabric material, a fabric layer, and/or a garment treated in accordance with the present disclosure can contain fluorine in an amount less than about 1,000 ppm, such as in an amount less than about 500 ppm, such as in an amount less than about 100 ppm, such as in an amount less than about 50 ppm, such as in an amount less than about 40 ppm, such as in an amount less than about 30 ppm, such as in an amount less than about 20 ppm. In some aspects, a fabric material, a fabric layer, and/or a garment treated in accordance with the present disclosure can contain fluorine in an amount greater than about 0 ppm. Further, for instance, a fabric material, a fabric layer, and/or a garment treated in accordance with the present disclosure can contain fluorine in an amount less than about 1,000 ppb, such as in an amount less than about 500 ppb, such as in an amount less than about 100 ppb, such as in an amount less than about 50 ppb, such as in an amount less than about 40 ppb, such as in an amount less than about 30 ppb, such as in an amount less than about 20 ppb.

In general, the fluorine content in a fabric material, a fabric layer, and/or a garment may be determined using particle-induced gamma emission (PIGE). PIGE is a form of nuclear reaction analysis using an ion beam analysis through thin-film analytical techniques. A MeV proton beam is projected on to a fabric material, a fabric layer, and/or a garment sample and the protons excite the target nuclei such that gamma rays are emitted which can produce a spectrum for determining fluorine content.

In one aspect, the fluid resistant treatment and/or one or more components thereof (e.g., water resistant composition, oil resistant composition) is free or is substantially free of perfluorinated carboxylic acids, such as free or substantially free of perfluorooctanoic acid. For instance, perfluorooctanoic acid or any perfluorinated carboxylic acids may be present in the fluid resistant treatment and/or a component thereof in an amount less than about 2% by weight, such as in an amount less than about 1% by weight, such as in an amount of less than 0.5% by weight, such as in an amount less than about 0.25% by weight, such as in an amount less than about 0.1% by weight. Further, for instance, perfluorooctanoic acid or any perfluorinated carboxylic acids may be present in the treated fabric and/or treated garment in an amount less than about 2% by weight, such as in an amount less than about 1% by weight, such as in an amount of less than 0.5% by weight, such as in an amount less than about 0.25% by weight, such as in an amount less than about 0.1% by weight.

In another aspect, the fluid resistant treatment and/or one or more components thereof (e.g., water resistant composition, oil resistant composition) can be free or substantially free of polyfluoroalkyl compounds, including C6 compounds. For instance, the fluid resistant treatment and/or any components thereof can contain one or more polyfluoroalkyl compounds in an amount less than about 2% by weight, such as in an amount less than about 1% by weight, such as in an amount less than about 0.5% by weight, such as in an amount less than about 0.25% by weight, such as in an amount less than about 0.1% by weight. Further, for instance, a treated fabric layer, treated fabric material, and/or treated garment can contain one or more polyfluoroalkyl compounds in an amount less than about 2% by weight, such as in an amount less than about 1% by weight, such as in an amount less than about 0.5% by weight, such as in an amount less than about 0.25% by weight, such as in an amount less than about 0.1% by weight.

Generally, the fluid resistant treatment may contain one or more binders and/or one or more cross-linking agents combined with various other ingredients and components. For instance, the fluid resistant treatment may also include one or more softeners.

In one aspect, the fluid resistant treatment may comprise a binder. The binder contained in the fluid resistant treatment may comprise a polyurethane polymer. In general, a polyurethane polymer may be formed by the reaction of an isocyanate and a polyol. Of particular advantage, the polyurethane polymer can be water-based and thus can be applied to the fabric in an aqueous dispersion. The polyurethane polymer may be a polyester/ether polyurethane polymer, such as an anionic, aliphatic polyester/ether polyurethane. In one aspect, only a single binder can be used in the formulation. In other aspects, however, multiple binders can be used as desired.

Generally, the above binder can be combined with one or more cross-linking agents. For instance, in one aspect, the fluid resistant treatment includes a first polyurethane polymer as described above combined with a second polyurethane polymer, the second polyurethane polymer being a cross-linking agent. The second polyurethane polymer may comprise a blocked isocyanate, such as an oxime-blocked isocyanate. The blocked isocyanate may be formed from an isocyanate moiety and a suitable blocking agent. Notably, for instance, the blocked isocyanate may be formed from an NCO terminated polyurethane prepolymer.

In some aspects, as previously disclosed herein, the fluid resistant treatment may comprise one or more cross-linking agents. In one aspect, the one or more cross-linking agents may comprise an ethyl acrylate polymer and/or a blocked isocyanate. In a further aspect, the one or more cross-linking agents may comprise a cellulosic cross-linking agent. The one or more cross-linking agents may be cationic or nonionic. In some aspects, the one or more cross-linking agents may comprise a nonionic surfactant, a cationic surfactant, and/or an anionic surfactant.

In general, the one or more cross-linking agents can be self cross-linking such that cross-linking of molecular chains occurs without an additive being included to facilitate cross-linking of molecular chains. The presence of the one or more cross-linking agents is for further increasing water and oil resistance, as well as increasing abrasion resistance and improving UV stability.

The blocking agent of the blocked isocyanate can be selectively chosen from a variety of blocking agents. In one aspect, the blocking agent may be selected from phenols. For instance, phenols such as phenol, methylphenol, nonylphenol, chlorophenol, butylphenol, and alkylphenol may be used as a blocking agent. In another aspect, the blocking agent may be selected from lactams. For instance, lactams such as ε-caprolactam, β-propiolactam, γ-butyrolactam, and δ-valerolactam may be used as a blocking agent. In yet another aspect, the blocking agent may be selected from pyrazoles. For instance, pyrazoles such as pyrazole, 3,5-dimethylpyrazole, and 3,5-dimethyl-4-nitropyrazole may be used as a blocking agent. In a further aspect, the blocking agent may be selected from oximes. For instance, oximes such as methyl ethyl ketone oxime, acetone oxime, and cyclohexanone oxime may be used as a blocking agent. In yet a further aspect, the blocking agent may be selected from imidazole compounds. For instance, imidazole compounds such as imidazole, 2-methylimidazole, 2-ethylimidazole, and 2-isopropylimidazole may be used as a blocking agent.

It should be noted that all of the blocking agents previously disclosed herein comprise a non-limiting list. As such, the blocking agent may be selected from other compounds including, but not limited to, alcohols, active methylene compounds, amides, hydroxamates, bisulfite addition compounds, dicarbonyl compounds, hydroxylamines, and/or esters of p-hydroxybenzoic acid and salicylic acid.

In one aspect, the concentration of one or more cross-linking agents in the fluid resistant treatment can be from about 0.05% to about 20%, including all increments of 0.01% therebetween. For instance, one or more cross-linking agents may be present in the fluid resistant treatment in a concentration of about 0.05% or greater, such as about 0.1% or greater, such as about 0.5% or greater, such as about 1% or greater, such as about 2% or greater, such as about 3% or greater, such as about 4% or greater, such as about 5% or greater, such as about 6% or greater, such as about 7% or greater, such as about 8% or greater, such as about 9% or greater, such as about 10% or greater, such as about 15% or greater. Generally, the concentration of one or more cross-linking agents in the fluid resistant treatment is about 20% or less, such as about 15% or less, such as about 10% or less, such as about 9% or less, such as about 8% or less, such as about 7% or less, such as about 6% or less, such as about 5% or less, such as about 4% or less, such as about 3% or less, such as about 2% or less, such as about 1% or less, such as about 0.5% or less, such as about 0.2% or less. The aforementioned percentages may also be based on the weight of the one or more cross-linking agents in the fluid resistant treatment based on the weight of the fluid resistant treatment. In this respect, one or more cross-linking agents may be present in the fluid resistant treatment in an amount from about 0.05 wt. % to about 20 wt. %, including all increments of 0.01 wt. % therebetween, based on the weight of the fluid resistant treatment.

In some aspects, the fluid resistant treatment may comprise one or more wetting agents. In one aspect, a wetting agent can comprise ethoxylated fatty alcohol, isopropyl alcohol, or a combination thereof. Notably, the wetting agent of the present disclosure may be selectively chosen such that all or the majority of the wetting agent evaporates during the drying and/or curing of the garment.

When a wetting agent is included in the fluid resistant treatment as disclosed herein, the wetting agent may enhance the uniformity of application of the fluid resistant treatment such that the fluid resistant treatment uniformly impregnates the fibers of the garment. For instance, isopropyl alcohol may decrease the surface tension of the fluid resistant treatment such that the fluid resistant treatment uniformly impregnates the fibers of the garment.

In general, the wetting agent can have a pH from about 4.0 to about 9.0, such as a pH of 4.0 or more, such as 5.0 or more, such as 6.0 or more, such as 7.0 or more, such as 8.0 or more. Generally, the wetting agent has a pH of less than 9.0, such as 8.0 or less, such as 7.0 or less, such as 6.0 or less, such as 5.0 or less.

In one aspect, the concentration of one or more wetting agents in the fluid resistant treatment can be from about 0.01% to about 10%, including all increments of 0.01% therebetween. For instance, one or more wetting agents may be present in the fluid resistant treatment in a concentration of about 0.01% or greater, such as about 0.05% or greater, such as about 0.1% or greater, such as about 0.2% or greater, such as about 0.3% or greater, such as about 0.4% or greater, such as about 0.5% or greater, such as about 0.6% or greater, such as about 0.7% or greater, such as about 0.8% or greater, such as about 0.9% or greater, such as about 1.0% or greater, such as about 2% or greater, such as about 5% or greater. Generally, the concentration of one or more wetting agents in the fluid resistant treatment is about 10% or less, such as about 5% or less, such as about 2% or less, such as about 1% or less, such as about 0.9% or less, such as about 0.8% or less, such as about 0.7% or less, such as about 0.6% or less, such as about 0.5% or less, such as about 0.4% or less, such as about 0.3% or less, such as about 0.2% or less, such as about 0.1% or less. The aforementioned percentages may also be based on the weight of the wetting agent in the fluid resistant treatment by the weight of the fluid resistant treatment. In this respect, one or more wetting agents may be present in the fluid resistant treatment in an amount from about 0.01 wt. % to about 10 wt. %, including all increments of 0.01 wt. % therebetween, based on the weight of the fluid resistant treatment.

In some aspects, one or more wetting agents and one or more cross-linking agents may be present in the fluid resistant treatment in a weight ratio of about 1:40 to about 1:1, including all incremental ratios therebetween. For instance, a wetting agent may be present in relation to one or more cross-linking agents in a weight ratio of about 1:40 or greater, such as about 1:30 or greater, such as about 1:25 or greater, such as about 1:20 or greater, such as about 1:15 or greater, such as about 1:10 or greater, such as about 1:5 or greater, such as about 1:1 or less, such as about 1:5 or less, such as about 1:10 or less, such as about 1:15 or less, such as about 1:20 or less, such as about 1:25 or less, such as about 1:30 or less.

In one aspect, the fluid resistant treatment may comprise one or more softeners. In one aspect, the softener can comprise a cross-linkable silicone elastomer. For instance, the softener may comprise an amino-functional silicone macroemulsion. In another aspect, the softener can comprise an emulsion of a polyalkylene polymer. In yet another aspect, the softener is a polyethylene polymer, such as a lower molecular weight polyethylene polymer. The softener can provide for strong fiber lubrication properties, improved sewability, improved shape recovery, and stretch recovery, increased durability to washing, and a crease-resistant finishing. Notably, in one aspect, the fluid resistant treatment may comprise one or more hydrophobic softeners.

In one aspect, the concentration of the softener in the fluid resistant treatment can be from about 0.01% to about 10%, including all increments of 0.01% therebetween. For instance, the concentration of the softener in the fluid resistant treatment may be about 0.01% or greater, such as about 0.05% or greater, such as about 0.1% or greater, such as about 0.2% or greater, such as about 0.3% or greater, such as about 0.4% or greater, such as about 0.5% or greater, such as about 0.6% or greater, such as about 0.7% or greater, such as about 0.8% or greater, such as about 0.9% or greater, such as about 1.0% or greater, such as about 2% or greater, such as about 5% or greater. Generally, the concentration of one or more softeners in the fluid resistant treatment is about 10% or less, such as about 5% or less, such as about 2% or less, such as about 1% or less, such as about 0.9% or less, such as about 0.8% or less, such as about 0.7% or less, such as about 0.6% or less, such as about 0.5% or less, such as about 0.4% or less, such as about 0.3% or less, such as about 0.2% or less, such as about 0.1% or less. The aforementioned percentages may also be based on the weight of the softener in the fluid resistant treatment by the weight of the fluid resistant treatment. In this respect, one or more softeners may be present in the fluid resistant treatment in an amount from about 0.01 wt. % to about 10 wt. %, including all increments of 0.01 wt. % therebetween, based on the weight of the fluid resistant treatment.

In general, the fluid resistant treatment may comprise an aqueous composition (e.g., water) in an amount of about 5 wt. % to about 99.99 wt. % by the weight of the fluid resistant treatment, including all increments of 0.01 wt. % therebetween. For instance, the fluid resistant treatment may comprise an aqueous composition (e.g., water) in an amount of about 5 wt. % or more, such as about 10 wt. % or more, such as about 20 wt. % or more, such as about 30 wt. % or more, such as about 40 wt. % or more, such as about 50 wt. % or more, such as about 60 wt. % or more, such as about 70 wt. % or more, such as about 80 wt. % or more, such as about 90 wt. % or more. Generally, the aqueous composition may be present in the fluid resistant treatment in an amount by weight of about 99.99 wt. % or less, such as about 90 wt. % or less, such as about 80 wt. % or less, such as about 70 wt. % or less, such as about 60 wt. % or less, such as about 50 wt. % or less, such as about 40 wt. % or less, such as about 30 wt. % or less, such as about 20 wt. % or less, such as about 10 wt. % or less.

As previously disclosed herein, a fluid resistant treatment formed in accordance with the present disclosure may include a water resistant composition. It should be understood that a fluid resistant treatment formed in accordance with the present disclosure may comprise more than one water resistant composition, such as two water resistant compositions, such as three water resistant compositions. In general, a fabric material may be treated with a water resistant composition.

In general, the water resistant composition may be in the form of an emulsion and/or a dispersion. Notably, the water resistant composition may include one or more repelling agents. In some aspects, the one or more repelling agents may include an acrylic-containing polymer, a silicone-containing polymer, or a combination thereof. For instance, a water resistant composition formed in accordance with the present disclosure may be an emulsion and/or a dispersion comprising an acrylic-containing polymer, a silicone-containing polymer, or a combination thereof. In some aspects, the emulsion and/or a dispersion may include solid polymer particles, such as acrylic-containing polymer particles and/or silicone-containing polymer particles.

In general, the water resistant composition may comprise an aqueous composition (e.g., water) in an amount of about 5 wt. % to about 99.99 wt. % by weight of the water resistant composition, including all increments of 0.01 wt. % therebetween. For instance, the water resistant composition may comprise an aqueous composition (e.g., water) in an amount of about 5 wt. % or more, such as about 10 wt. % or more, such as about 20 wt. % or more, such as about 30 wt. % or more, such as about 40 wt. % or more, such as about 50 wt. % or more, such as about 60 wt. % or more, such as about 70 wt. % or more, such as about 80 wt. % or more, such as about 90 wt. % or more. Generally, the aqueous composition may be present in the water resistant composition in an amount by weight of about 99.99 wt. % or less, such as about 90 wt. % or less, such as about 80 wt. % or less, such as about 70 wt. % or less, such as about 60 wt. % or less, such as about 50 wt. % or less, such as about 40 wt. % or less, such as about 30 wt. % or less, such as about 20 wt. % or less, such as about 10 wt. % or less.

Generally, in one aspect, a repelling agent may include a polyacrylate that also serves as a binder. In one aspect, a repelling agent may include an acrylic polymer alone or in combination with a wax, such as a paraffin wax. In one aspect, the acrylic polymer may be partially, such as mostly, water-soluble when in the water resistant composition. The water-solubility of the acrylic polymer may decrease or cease after the acrylic polymer dries and cures. In this respect, the acrylic polymer may be water resistant after it dries and cures. In another aspect, the wax may be insoluble in water.

In general, the water resistant composition and/or a repelling agent thereof may have a pH from about 2 to about 8, such as a pH of about 2 or greater, such as about 3 or greater, such as about 4 or greater, such as about 5 or greater, such as about 6 or greater, such as about 7 or greater, such as about 8 or less, such as about 7 or less, such as about 6 or less, such as about 5 or less, such as about 4 or less, such as about 3 or less. For instance, in one aspect, an acrylic emulsion may have a pH from about 2 to about 8, including all incremental values therebetween.

As previously disclosed herein, a repelling agent of the water resistant composition may contain a silicone-containing polymer (e.g., a silicone-based polymer, a silicone modified polymer). In this respect, in some aspects, the repelling agent of the water resistant composition may include a silicone-based polymer and/or a silicone modified polymer.

In some aspects, the repelling agent of the water resistant composition may comprise a copolymer copolymerized with acrylic monomers and/or silicone monomers. Generally, the copolymer may be in the form of a random copolymer, a block copolymer, or a graft copolymer.

In some aspects, the repelling agent may include a silicone-based polymer. The silicone-based polymer may be a modified silicone-based polymer The silicone-based polymer may be soluble in water. Generally, the silicone-based polymer may be cationic or nonionic.

Generally, modification of a silicone-based polymer may enhance properties such as water resistance properties, durability, flexibility, softness, and strength of the treated fabric material. In one aspect, the silicone-based polymer of the present disclosure may be carboxyl-modified, co-modified, epoxy-modified, phenol-modified, or more generally any modified silicone-based polymer. In one aspect, a modified silicone-based polymer may be of a side-chain type, a single-end type, a dual-end type, or a side-chain dual-end type. In this respect, the type of modified silicone-based polymer may be selectively chosen to enhance the properties of a fabric material treated by the water resistant composition of the present disclosure. For instance, when a modified silicone-based polymer is a side-chain type, the chemical formula of the modified silicone-based polymer may be:

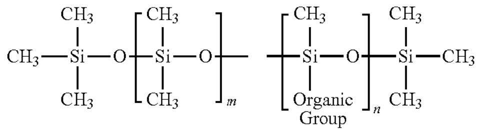

Further for instance, when the modified silicone-based polymer is a single-end type, the chemical formula of the modified silicone-based polymer may be:

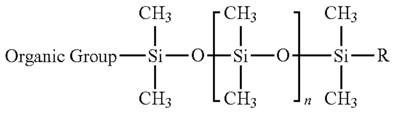

Further for instance, when the modified silicone-based polymer is a dual-end type, the chemical formula of the modified silicone-based may be:

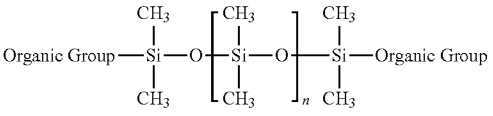

Further for instance, when the modified silicone-based polymer is a side-chain dual-end type, the chemical formula of the modified silicone-based polymer may be:

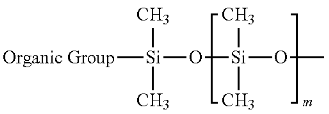

-continued

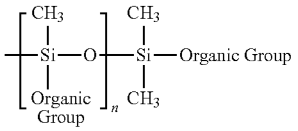

As previously disclosed, in one aspect, the repelling agent may include a silicone modified polymer, such as a silicone modified acrylic polymer. The silicone modified acrylic polymer may be in the form of a silicone modified acrylic emulsion. The hydroxyl value of the silicone modified acrylic polymer may be selectively chosen to enhance the properties of the treated fabric material. For instance, the hydroxyl value of the silicone modified acrylic polymer may be decreased to enhance the water resistance of the treated fabric material. In this respect, the residual number of hydroxyl groups of the water resistant composition may be decreased. A lower number of hydroxyl groups may increase the compatibility of a cross-linking agent with the silicone modified acrylic emulsion. For instance, the number of reactions of the NCO groups of blocked isocyanate with the silicone modified acrylic polymer may increase as the hydroxyl value of the silicone modified acrylic polymer is decreased. In this respect, the increased number of reactions of blocked isocyanate with the silicone modified acrylic polymer may enhance the durability and the water resistance properties of a fabric material treated with a water resistant composition of the present disclosure.

In one aspect, the hydroxyl value of a repelling agent, such as a silicone-containing polymer, of the water resistant composition may be from about 5 mg KOH/g to about 400 mg KOH/g, such as about 5 mg KOH/g or greater, such as about 25 mg KOH/g or greater, such as about 50 mg KOH/g or greater, such as about 75 mg KOH/g or greater, such as about 100 mg KOH/g or greater, such as about 125 mg KOH/g or greater, such as about 150 mg KOH/g or greater, such as about 175 mg KOH/g or greater, such as about 200 mg KOH/g or greater, such as about 225 mg KOH/g or greater, such as about 250 mg KOH/g or greater. Generally, the hydroxyl value of a repelling agent, such as a silicone-containing polymer, of the water resistant composition is less than about 400 mg KOH/g, such as about 350 mg KOH/g or less, such as about 300 mg KOH/g or less, such as about 250 mg KOH/g or less, such as about 225 mg KOH/g or less, such as about 200 mg KOH/g or less, such as about 175 mg KOH/g or less, such as about 150 mg KOH/g or less, such as about 125 mg KOH/g or less, such as about 100 mg KOH/g or less, such as about 75 mg KOH/g or less, such as about 50 mg KOH/g or less, such as about 25 mg KOH/g or less, such as about 15 mg KOH/g or less.

In one aspect, the concentration of one or more repelling agents in the water resistant composition can be from about 0.05% to about 100%, including all increments of 0.01% therebetween. For instance, one or more repelling agents may be present in the water resistant composition in a concentration of about 0.05% or greater, such as about 0.1% or greater, such as about 0.5% or greater, such as about 1% or greater, such as about 2% or greater, such as about 5% or greater, such as about 10% or greater, such as about 15% or greater, such as about 20% or greater, such as about 25% or greater, such as about 30% or greater, such as about 35% or greater, such as about 40% or greater, such as about 50% or greater, such as about 60% or greater, such as about 70% or greater, such as about 80% or greater, such as about 90% or greater. Generally, the concentration of one or more repelling agents in the water resistant composition is about 100% or less, such as about 90% or less, such as about 80% or less, such as about 70% or less, such as about 60% or less, such as about 50% or less, such as about 40% or less, such as about 35% or less, such as about 30%, such as about 25% or less, such as about 20% or less, such as about 15% or less, such as about 10% or less, such as about 5% or less, such as about 2% or less, such as about 1% or less, such as about 0.5% or less, such as about 0.2% or less. The aforementioned percentages may also be based on the weight of the repelling agent in the water resistant composition by weight of the water resistant composition. In this respect, one or more repelling agents may be present in the water resistant composition in an amount from about 0.05 wt. % to about 100 wt. %, including all increments of 0.01 wt. % therebetween, based on the weight of the water resistant composition.

In one aspect, the concentration of the water resistant composition in the fluid resistant treatment can be from about 0.05% to about 40%, including all increments of 0.01% therebetween. For instance, the concentration of the water resistant composition in the fluid resistant treatment can be about 0.05% or greater, such as about 0.1% or greater, such as about 0.5% or greater, such as about 1% or greater, such as about 2% or greater, such as about 5% or greater, such as about 10% or greater, such as about 15% or greater, such as about 20% or greater, such as about 25% or greater, such as about 30% or greater, such as about 35% or greater. Generally, the concentration of the water resistant composition in the fluid resistant treatment is about 40% or less, such as about 35% or less, such as about 30% or less, such as about 25% or less, such as about 20% or less, such as about 15% or less, such as about 10% or less, such as about 5% or less, such as about 2% or less, such as about 1% or less, such as about 0.5% or less, such as about 0.2% or less. The aforementioned percentages may also be based on the weight of the water resistant composition in the fluid resistant treatment by the weight of the fluid resistant treatment. In this respect, the water resistant composition may be present in the fluid resistant treatment in an amount from about 0.05 wt. % to about 40 wt. %, including all increments of 0.01 wt. % therebetween, based on the weight of the fluid resistant treatment.

In general, the water resistant composition and the oil resistant composition may be present in the fluid resistant treatment in a weight ratio of about 1:10 to about 10:1, including all incremental ratios therebetween. For instance, the water resistant composition may be present in relation to the oil resistant composition in a weight ratio of about 1:10 or greater, such as about 1:5 or greater, such as about 2:5 or greater, such as about 1:2 or greater, such as about 3:5 or greater, such as bout 3:4 or greater, such as about 1:1 or greater, such as about 4:3 or greater, such as about 5:3 or greater, such as about 2:1 or greater, such as about 5:2 or greater, such as about 5:1 or greater, such as about 10:1 or less, such as about 5:1 or less, such as about 5:2 or less, such as about 2:1 or less, such as about 5:3 or less, such as about 4:3 or less, such as about 1:1 or less, such as about 3:4 or less, such as about 3:5 or less, such as about 1:2 or less, such as about 2:5 or less, such as about 1:5 or less. For instance, in one aspect, if the water resistant composition is present in the fluid resistant treatment in an amount of 12 wt. % and the oil resistant composition is present in the fluid resistant treatment in an amount of 16 wt. %., the water resistant composition is present in relation to the oil resistant composition in a weight ratio of 3:4.

Generally, the water resistant composition and one or more cross-linking agents may be present in the fluid resistant treatment in a weight ratio of about 1:2 to about 15:1, including all incremental ratios therebetween. For instance, the water resistant composition may be present in relation to one or more cross-linking agents in a weight ratio of about 1:2 or greater, such as about 3:5 or greater, such as bout 3:4 or greater, such as about 1:1 or greater, such as about 4:3 or greater, such as about 5:3 or greater, such as about 2:1 or greater, such as about 5:2 or greater, such as about 5:1 or greater, such as about 10:1 or greater, such as about 15:1 or less, such as about 10:1 or less, such as about 5:1 or less, such as about 5:2 or less, such as about 2:1 or less, such as about 5:3 or less, such as about 4:3 or less, such as about 1:1 or less, such as about 3:4 or less, such as about 3:5 or less.

In general, the water resistant composition and one or more wetting agents may be present in the fluid resistant treatment in a weight ratio of about 4:1 to about 40:1, including all incremental ratios therebetween. For instance, the water resistant composition may be present in relation to one or more wetting agents in a weight ratio of about 4:1 or greater, such as about 5:1 or greater, such as bout 10:1 or greater, such as about 15:1 or greater, such as about 20:1 or greater, such as about 25:1 or greater, such as about 30:1 or greater, such as about 35:1 or greater, such as about 40:1 or less, such as about 35:1 or less, such as about 30:1 or less, such as about 25:1 or less, such as about 20:1 or less, such as about 15:1 or less, such as about 10:1 or less, such as about 5:1 or less.

In one aspect, as previously disclosed herein, a fluid resistant treatment formed in accordance with the present disclosure may comprise an oil resistant composition. It should be understood that a fluid resistant treatment formed in accordance with the present disclosure may comprise more than one oil resistant composition, such as two oil resistant compositions, such as three oil resistant compositions. In general, a fabric material may be treated with an oil resistant composition.

Generally, an oil resistant composition may comprise one or more polymers, such as one or more silicone-containing polymers. In some aspects, the one or more polymers may be in the form of polymer particles. In some aspects, the oil resistant composition may be in the form of an emulsion, a dispersion, or a combination thereof. Notably, in one aspect, the oil resistant composition is an aqueous dispersion including water and one or more polymers. In another aspect, the oil resistant composition is an aqueous emulsion including water and one or more polymers.

In general, the oil resistant composition may comprise an aqueous composition (e.g., water) in an amount of about 5 wt. % to about 99.99 wt. % by weight of the oil resistant composition, including all increments of 0.01 wt. % therebetween. For instance, the oil resistant composition may comprise an aqueous composition (e.g., water) in an amount of about 5 wt. % or more, such as about 10 wt. % or more, such as about 20 wt. % or more, such as about 30 wt. % or more, such as about 40 wt. % or more, such as about 50 wt. % or more, such as about 60 wt. % or more, such as about 70 wt. % or more, such as about 80 wt. % or more, such as about 90 wt. % or more. Generally, the aqueous composition may be present in the oil resistant composition in an amount by weight of about 99.99 wt. % or less, such as about 90 wt. % or less, such as about 80 wt. % or less, such as about 70 wt. % or less, such as about 60 wt. % or less, such as about 50 wt. % or less, such as about 40 wt. % or less, such as about 30 wt. % or less, such as about 20 wt. % or less, such as about 10 wt. % or less.

Generally, the oil resistant composition may have a solids (e.g., polymer) content in an amount from about 5 wt. % to about 60 wt. % by weight of the oil resistant composition, including all increments of 0.01 wt. % therebetween. For instance, the oil resistant composition may have a solids content of about 5 wt. % or more, such as about 10 wt. % or more, such as about 20 wt. % or more, such as about 30 wt. % or more, such as about 40 wt. % or more, such as about 50 wt. % or more. Generally, solids may be present in the oil resistant composition in an amount by weight of about 60 wt. % or less, such as about 50 wt. % or less, such as about 40 wt. % or less, such as about 30 wt. % or less, such as about 20 wt. % or less, such as about 10 wt. % or less.

In general, one or more polymers of the oil resistant composition may comprise a polydimethylsiloxane, a polyethylene, a polypropylene, a polybutylene, a polyvinyl chloride, a polyethylene terephthalate, a polyether, a polyurethane, a polyurea, a polyamide, a polyimide, a polysulfone, a polycarbonate, a polytetrafluoroethylene, a polyacrylate, a polymethacrylate, a polystyrene, a polyarylene, a polyester, a polyvinyl ester, a poly(allyl ether), and/or any copolymers thereof, or a combination thereof.

Generally, one or more polymers of the oil resistant composition may have a polydimethylsiloxane backbone, a polyethylene backbone, a polypropylene backbone, a polybutylene backbone, a polyvinyl chloride backbone, a polyethylene terephthalate backbone, a polyether backbone, a polyurethane backbone, a polyurea backbone, a polyamide backbone, a polyimide backbone, a polysulfone backbone, a polycarbonate backbone, a polytetrafluoroethylene backbone, a polyacrylate backbone, a polymethacrylate backbone, a polystyrene backbone, a polyarylene backbone, a polyester backbone, a polyvinyl ester backbone, a poly(allyl ether) backbone, and/or any copolymers thereof, or a combination thereof.

In general, the one or more polymers of the oil resistant composition may comprise one or more linear polymers and/or one or more branched polymers (e.g., a pendant branched polymer). Notably, in some aspects, one or more polymers of the oil resistant composition may comprise one or more pendant groups.

In general, one or more polymers of the oil resistant composition may include one or more cross-linkable groups. For instance, one or more polymers (e.g., a polydimethylsiloxane) of the oil resistant composition may include one or more cross-linkable groups such as vinyl groups, hydroxyl groups, silanol groups, acrylate groups, methacrylate groups, thiol groups, epoxy groups, isocyanate groups, allyl groups, amine groups, phosphine groups, cyanate groups, halide groups, carboxylic acid groups, aldehyde groups, alkoxysilane groups, alkyne groups, azide groups, silane groups, hydrogen, hydrosilane, or a combination thereof. In some aspects, vinyl groups, hydroxyl groups, silanol groups, acrylate groups, methacrylate groups, thiol groups, epoxy groups, isocyanate groups, allyl groups, amine groups, phosphine groups, cyanate groups, halide groups, carboxylic acid groups, aldehyde groups, alkoxysilane groups, alkyne groups, azide groups, silane groups, hydrogen, hydrosilane, or a combination thereof, may be one or more terminal groups of one or more polymers of the oil resistant composition.

Notably, the one or more cross-linkable groups may bond, or more generally interact, with a fabric material and/or a garment via covalent bonds, hydrogen bonds, ionic bonds, van der Waals forces, or a combination thereof.

In general, the one or more polymers of the oil resistant composition may comprise various quantities and types of surface charges. In this respect, the one or more polymers of the oil resistant composition may have one or more surface charges including one or more negative charges, one or more positive charges, one or more zwitterionic charges, or a combination thereof.

Notably, in some aspects, the oil resistant composition may comprise a silicone-based polymer and/or a silicone-based copolymer, and more generally may comprise a silicone-containing polymer. For instance, in one aspect, the oil resistant composition may comprise one or more siloxanes, such as one or more polydimethylsiloxane polymers and/or one or more polydimethylsiloxane copolymers (e.g., block copolymers, random copolymers, graft copolymers). In general, the one or more polydimethylsiloxanes may comprise one or more linear polydimethylsiloxanes and/or one or more branched polydimethylsiloxanes (e.g., a pendant branched polydimethylsiloxane).

Generally, the backbone or main chain of a linear polymer (e.g., linear polydimethylsiloxane) and/or a branched polymer (e.g., a branched polydimethylsiloxane) may comprise one or more aliphatic groups (e.g., one or alkyl groups, one or more alkene groups, one or more alkyne groups) and/or one or more aliphatic moieties. The one or more aliphatic groups and/or one or more aliphatic moieties may include one or more aliphatic groups and/or one or more aliphatic moieties that are saturated and/or unsaturated. In general, as previously disclosed herein, the one or more aliphatic groups and/or one or more aliphatic moieties may include one or more alkyl groups (e.g., methyl groups, ethyl groups, propyl groups, butyl groups, and/or pentyl groups). In some aspects, the aliphatic groups and/or aliphatic moieties may have a carbon chain length of from $C_1$ to $C_{40}$, including all increments of one carbon therebetween. For instance, the aliphatic groups and/or aliphatic moieties may have a carbon chain length such as $C_1$-$C_5$, such as $C_1$-$C_{10}$, such as $C_1$-$C_{15}$, such as $C_1$-$C_{20}$, such as $C_1$-$C_{30}$, such as $C_1$-$C_{40}$.

In one aspect, one or more pendant groups of a polymer of the oil composition may include one or more tris(trialkylsiloxy)silyl groups, one or more alkoxysilane groups, or a combination thereof.

In one aspect, one or more polymers of the oil resistant composition may include one or more groups (e.g., one or more pendant groups) having the following structure:

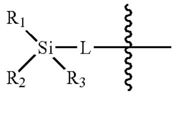

wherein, each of $R_1$, $R_2$, and $R_3$ are independently alkyl groups (e.g., methyl groups, ethyl groups, propyl groups, butyl groups, and/or pentyl groups), alkoxy groups (e.g., methoxy groups and/or ethoxy groups), aryl groups, hydroxyl groups, halogen groups, —O—SiR' groups, —O—SiOR' groups, or combinations thereof, wherein R' groups are independently chosen from alkyl groups (e.g., methyl groups, ethyl groups, propyl groups, butyl groups, and/or pentyl groups) and/or aryl groups;

wherein each L is a linking group comprising alkyl groups, aryl groups, silyl groups, or combinations thereof. In general, the linking group may be a —O— group, a $—CH_2—$ group, a $—(CH_2)_2—$ group, a $—(CH_2)_3—$ group, a $—Si(CH_3)_2O—$ group, a $—OSi(CH_3)_2O—$ group, a $—CH_2CH_{30}—$ group, a $—OSi(CH_2CH_3)_2O—$ group, a $—CH_2O—$ group, a $—(CH_2)_2O—$ group, a $—CH_2C{=}O—$ group, a $—OC{=}ONH—$ group, a $—CH_2N—$ group, a $—CH_2SO_2—$ group, a

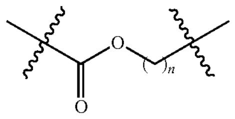

group, a

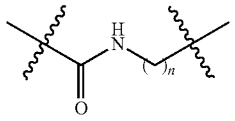

group, a

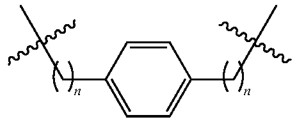

group, where n is a value from 0 to 40, including all incremental values therebetween. In one aspect, one or more groups (e.g., one or more pendant groups) having the aforementioned structure (i.e.,

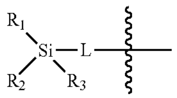

may be an oleophobic pendant group. In general, one or more pendant groups may be covalently bonded to a polymer and/or copolymer of the oil resistant composition. In one aspect, the aforementioned structure may not have a linking group. In this respect, in one aspect, one or more polymers of the oil resistant composition may include one or more groups (e.g., one or more pendant groups) having the following structure:

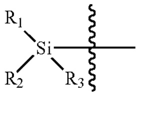

wherein, each of $R_1$, $R_2$, and $R_3$ are independently alkyl groups (e.g., methyl groups, ethyl groups, propyl groups, butyl groups, and/or pentyl groups), alkoxy groups (e.g., methoxy groups and/or ethoxy groups), aryl groups, hydroxyl groups, halogen groups, —O—SiR' groups, —O—SiOR' groups, or a combination thereof, wherein R' groups are independently chosen from alkyl groups (e.g., methyl groups, ethyl groups, propyl groups, butyl groups, and/or pentyl groups) and/or aryl groups.

Generally, the oil resistant composition and/or one or more polymers thereof may include and/or be formed with one or more cationic surfactants, one or more anionic surfactants, one or more nonionic surfactants, one or more zwitterionic surfactants, or a combination thereof. In one aspect, one or more cationic surfactants may be utilized to stabilize the oil resistant composition, and more generally may be utilized in the formation of the oil resistant composition. In this respect, in one aspect, a reaction mixture including one or more surfactants may be utilized to form the oil resistant composition. Notably, if the oil resistant composition is in the form of an emulsion or a dispersion, the inclusion of one or more cationic surfactants in the oil resistant composition and/or in the formation of the oil resistant composition may result in the formation of a cationically stabilized emulsion or a cationically stabilized dispersion, such as a cationically stabilized polymer emulsion or a cationically stabilized polymer dispersion. In this respect, the inclusion of one or more cationic surfactants may result in the formation of a positively charged polymer dispersion, a positively charged polymer emulsion, and/or a positively charged oil resistant composition. In another aspect, one or more anionic surfactants may be utilized to stabilize the oil resistant composition, and more generally may be utilized in the formation of the oil resistant composition. For instance, if the oil resistant composition is in the form of an emulsion or a dispersion, the inclusion of one or more anionic surfactants in the oil resistant composition and/or in the formation of the oil resistant composition may result in the formation of an anionically stabilized emulsion or an anionically stabilized dispersion, such as an anionically stabilized polymer emulsion or an anionically stabilized polymer dispersion. In this respect, the inclusion of one or more anionic surfactants may result in the formation of a negatively charged polymer dispersion, a negatively charged polymer emulsion, and/or a negatively charged oil resistant composition. Notably, one or more polymers of a stabilized emulsion or stabilized dispersion may include any of the polymers of the oil resistant composition disclosed herein, including any copolymers and/or combinations thereof.

In some aspects, the oil resistant composition may have a pH from about 2 to about 8, such as a pH of about 2 or more, such as about 3 or more, such as about 4 or more, such as about 5 or more, such as about 6 or more, such as about 7 or more, such as about 8 or less, such as about 7 or less, such as about 6 or less, such as about 5 or less, such as about 4 or less, such as about 3 or less.

In some aspects, the oil resistant composition may have a density from about 0.1 $kg/m^3$ to about 5 $kg/m^3$, including all increments of 0.1 $kg/m^3$ therebetween. For instance, the oil resistant composition may have a density of about 0.1 $kg/m^3$ or more, such as about 0.2 $kg/m^3$ or more, such as about 0.4 $kg/m^3$ or more, such as about 0.6 $kg/m^3$ or more, such as about 0.8 $kg/m^3$ or more, such as about 0.9 $kg/m^3$ or more, such as about 1 $kg/m^3$ or more, such as about 1.1 $kg/m^3$ or more, such as about 1.2 $kg/m^3$ or more, such as about 1.4 $kg/m^3$ or more, such as about 1.6 $kg/m^3$ or more, such as about 1.8 $kg/m^3$ or more, such as about 2 $kg/m^3$ or more, such as about 3 $kg/m^3$ or more, such as about 4 $kg/m^3$ or more, such as about 5 $kg/m^3$ or less, such as about 4 $kg/m^3$ or less, such as about 3 $kg/m^3$ or less, such as about 2 $kg/m^3$ or less, such as about 1.8 $kg/m^3$ or less, such as about 1.6 $kg/m^3$ or less, such as about 1.4 $kg/m^3$ or less, such as about 1.2 $kg/m^3$ or less, such as about 1.1 $kg/m^3$ or less, such as about 1 $kg/m^3$ or less, such as about 0.9 $kg/m^3$ or less, such as about 0.8 $kg/m^3$ or less, such as about 0.6 $kg/m^3$ or less, such as about 0.4 $kg/m^3$ or less, such as about 0.2 $kg/m^3$ or less.

In one aspect, the concentration of the oil resistant composition in the fluid resistant treatment can be from about 0.05% to about 40%, including all increments of 0.01% therebetween. For instance, the concentration of the oil resistant composition in the fluid resistant treatment can be about 0.05% or greater, such as about 0.1% or greater, such as about 0.5% or greater, such as about 1% or greater, such as about 2% or greater, such as about 5% or greater, such as about 10% or greater, such as about 15% or greater, such as about 20% or greater, such as about 25% or greater, such as about 30% or greater, such as about 35% or greater. Generally, the concentration of the oil resistant composition in the fluid resistant treatment is about 40% or less, such as about 35% or less, such as about 30% or less, such as about 25% or less, such as about 20% or less, such as about 15% or less, such as about 10% or less, such as about 5% or less, such as about 2% or less, such as about 1% or less, such as about 0.5% or less, such as about 0.2% or less. The aforementioned percentages may also be based on the weight of the oil resistant composition in the fluid resistant treatment by the weight of the fluid resistant treatment. In this respect, the oil resistant composition may be present in the fluid resistant treatment in an amount from about 0.05 wt. % to about 40 wt. %, including all increments of 0.01 wt. % therebetween, based on the weight of the fluid resistant treatment.

In general, the oil resistant composition and one or more wetting agents may be present in the fluid resistant treatment in a weight ratio of about 5:1 to about 50:1, including all incremental ratios therebetween. For instance, the oil resistant composition may be present in relation to one or more wetting agents in a weight ratio of about 5:1 or greater, such as bout 10:1 or greater, such as about 15:1 or greater, such as about 20:1 or greater, such as about 25:1 or greater, such as about 30:1 or greater, such as about 35:1 or greater, such as about 40:1 or greater, such as about 45:1 or greater, such as about 50:1 or less, such as about 45:1 or less, such as about 40:1 or less, such as about 35:1 or less, such as about 30:1 or less, such as about 25:1 or less, such as about 20:1 or less, such as about 15:1 or less, such as about 10:1 or less.

Generally, the oil resistant composition and one or more cross-linking agents may be present in the fluid resistant treatment in a weight ratio of about 1:2 to about 15:1, including all incremental ratios therebetween. For instance, the oil resistant composition may be present in relation to one or more cross-linking agents in a weight ratio of about 1:2 or greater, such as bout 1:1 or greater, such as about 2:1 or greater, such as about 4:1 or greater, such as about 6:1 or greater, such as about 8:1 or greater, such as about 10:1 or greater, such as about 15:1 or less, such as about 10:1 or less, such as about 8:1 or less, such as about 6:1 or less, such as about 4:1 or less, such as about 2:1 or less, such as about 1:1 or less.

Generally, the water resistant composition and the oil resistant composition can be combined together to form a fluid resistant treatment that is applied to a fabric material. Notably, other additives such as one or more wetting agents, one or more cross-linking agents, one or more binders, and/or one or more softeners may also be combined with a water resistant composition and/or an oil resistant composition to form a fluid resistant treatment that is applied to a fabric material. In one aspect, the water resistant composition, the oil resistant composition, and any other additives (e.g., one or more wetting agents, one or more cross-linking agents, one or more binders, and/or one or more softeners) discloses herein, may be applied to the fabric material separately.

Prior to applying the fluid resistant treatment, the fabric material can optionally be scoured using, for instance, an alkaline solution. After being scoured, the fabric material can be put on a tenter frame, dried, and heat seat. For instance, after scouring, the fabric material can be dried so that the moisture level is substantially equivalent to the natural moisture level of the fibers used to make the fabric material. For instance, the moisture level can be less than about 10% by weight, such as less than about 7% by weight, and generally greater than about 3% by weight.

After the fabric material has been dried and heat set, the fluid resistant treatment may be applied to at least one side of a fabric material. Although the treatment may be sprayed onto the fabric material as a liquid or foam or printed onto the fabric material, in one aspect, the fabric material is dipped into a bath containing the fluid resistant treatment. In one aspect, a one-step conventional pad application method may be utilized. Generally, in this method, a fabric is immersed in a liquid emulsion and then passed through nip rollers to remove excess amounts of the finishing mix in order to yield desired wet pick up.

The amount of the fluid resistant treatment applied to the fabric material will depend upon the particular formulation and the particular application. The dry add on can be greater than about 0.5% by weight, such as greater than about 1% by weight, such as greater than about 1.5% by weight, such as greater than about 2% by weight, such as greater than about 2.5% by weight, such as greater than about 3% by weight, and generally less than about 7% by weight, such as less than about 5% by weight, such as less than about 4% by weight, such as less than about 3.5% by weight.

After the fluid resistant treatment is applied to the fabric material, the fabric material is then heated to a temperature sufficient for the fluid resistant treatment to dry and/or cure. The fabric material then can be used in constructing various protective garments in accordance with the present disclosure.

The manner in which the fluid resistant treatment is applied to the fabric material may vary. In one aspect, the fluid resistant treatment is applied to the body-side or interior surface of the fabric material. Alternatively, the fluid resistant treatment is applied to the exterior surface of the fabric material. The durable fluid resistant treatment can be applied to the opposite side of the fabric material and, as described above, can impregnate the fabric.

The fluid resistant treatment may be impregnated into a fabric material or garment such that the material maintains a spray rating of at least 70, such as at least 80, such as at least 90, such as at least 95, such as 100, after five laundry cycles. The fabric material or garment may be tested for its spray rating according to Spray Test AATCC TM22-2017. The aforementioned spray ratings may also apply to a fabric material or garment after ten laundry cycles, fifteen laundry cycles, twenty laundry cycles, or twenty-five laundry cycles. The fabric material or garment can also maintain a water absorption of about 15% or less, such as about 10% or less, such as about 5% or less, such as about 4% or less, such as about 3% or less, such as about 2% or less, such as about 1% or less, after five laundry cycles. The fabric material or garment may be tested for its water absorption according to NFPA 1971-2018, 8.25. The aforementioned water absorption values may also apply to a fabric material or garment after ten laundry cycles, fifteen laundry cycles, twenty laundry cycles, or twenty-five laundry cycles.

In addition to water, fabric materials treated in accordance with the present disclosure also provide protection against various chemical agents such as acids, alkaline materials, alcohols, hydrocarbons, antifreeze, oils (e.g., vegetable oil, such as corn oil), and/or hydraulic fluids when tested according to test EN ISO 6530. For instance, when tested against a 30% sulfuric acid solution, a 10% sodium hydroxide solution, 1-Butanol, O-xylene, and/or any of the aforementioned chemical agents (e.g., vegetable oil, hydraulic fluid), fabric materials made according to the present disclosure may have an index of repellency of greater than about 30%, such as greater than about 40%, such as greater than about 50%, such as greater than about 60%, such as greater than about 70%, such as greater than about 75%, such as greater than about 80%, such as greater than about 85%, such as greater than about 90%, such as greater than about 92%, such as greater than about 94%, such as greater than about 96%, such as greater than about 98%, such as less than about 100%, such as less than about 98%, such as less than about 96%, such as less than about 94%, such as less than about 92%, such as less than about 90%, such as less than about 85%, such as less than about 80%, such as less than about 75%, such as less than about 70%, such as less than about 60%, such as less than about 50%. A fabric material and/or garment formed in accordance with the present disclosure may exhibit the aforementioned index of repellency values, including any incremental ranges therebetween, after multiple laundry cycles, such as 5, 10, or 25 laundry cycles.

When tested according to EN ISO 6530, the fabric material may have an index of penetration when tested against a 30% sulfuric acid solution, a 10% sodium hydroxide solution, 1-Butanol, O-xylene, and/or any of the aforementioned chemical agents (e.g., vegetable oil, hydraulic fluid), of less than about 20%, such as less than about 15%, such as less than about 10%, such as less than about 5%, such as less than about 4%, such as less than about 3%, such as less than about 2.5%, such as less than about 2%, such as less than about 1.5%, such as less than about 1%, such as less than about 0.5%, such as greater than about 0%, such as greater than about 0.5%, such as greater than about 1%, such as greater than about 1.5%, such as greater than about 2%, such as greater than about 2.5%, such as greater than about 3%, such as greater than about 4%, such as greater than about 5%, such as greater than about 10%, such as greater than about 15%. A fabric material and/or garment formed in accordance with the present disclosure may exhibit the aforementioned index of penetration values, including any incremental ranges therebetween, after multiple laundry cycles, such as 5, 10, or 25 laundry cycles. When the fabric material is incorporated into a composite, such as a three layer composite, the index of penetration may be 0%.

When tested according to EN ISO 6530, the fabric material may have an index of absorption when tested against a 30% sulfuric acid solution, a 10% sodium hydroxide solution, 1-Butanol, O-xylene, and/or any of the aforementioned chemical agents (e.g., vegetable oil, hydraulic fluid), of less than about 70%, such as less than about 60%, such as less than about 50%, such as less than about 40%, such as less than about 30%, such as less than about 20%, such as less than about 10%, such as less than about 9%, such as less than about 8%, such as less than about 7%, such as less than about 6%, such as less than about 5%, such as less than about 4%, such as less than about 3%, such as less than about 2%, such as less than about 1%, such as greater than about 0%, such as greater than about 1%, such as greater than about 2%, such as greater than about 3%, such as greater than about 4%, such as greater than about 5%, such as greater than about 6%, such as greater than about 7%, such as greater than about 8%, such as greater than about 9%, such as greater than about 10%, such as greater than about 20%, such as greater than about 30%, such as greater than about 40%, such as greater than about 50%, such as greater than about 60%. A fabric material and/or garment formed in accordance with the present disclosure may exhibit the aforementioned index of absorption values, including any incremental ranges therebetween, after multiple laundry cycles, such as 5, 10, or 25 laundry cycles.

Further, when tested according to AATCC TM 118-2020, the fabric material may have a category A, category B, category C, or category D categorization when tested with one or more of the various liquid samples previously disclosed herein. Further, when tested according to AATCC TM 118-2020, the fabric material may have an AATCC oil repellency grade of 0 to 8, such as 0 or more, such as 1 or more, such as 2 or more, such as 3 or more, such as 4 or more, such as 5 or more, such as 6 or more, such as 7 or more, such as 8 or less, such as 7 or less, such as 6 or less, such as 5 or less, such as 4 or less, such as 3 or less, such as 2 or less, such as 1 or less.

A fabric material treated with the fluid resistant treatment of the present disclosure may have an air permeability as determined by ASTM Test D737 of from about 1 cfm to about 250 cfm, such as about 1 cfm or more, such as about 3 cfm or more, such as about 5 cfm or more, such as about 10 cfm or more, such as about 20 cfm or more, such as about 50 cfm or more, such as about 100 cfm or more, such as about 150 cfm or more. Generally, the air permeability of a fabric material treated with the fluid resistant treatment of the present disclosure is less than about 250 cfm, such as 150 cfm or less, such as 100 cfm or less, such as 50 cfm or less, such as 20 cfm or less, such as 10 cfm or less, such as 5 cfm or less, such as 3 cfm or less. In one aspect, a fabric material treated with the fluid resistant treatment of the present disclosure has an air permeability as determined by ASTM Test D737 of about 1 cfm or less.

The fabric material treated in accordance with the present disclosure can be a single layer fabric or a multilayer fabric. The fibers used to make the fabric can depend upon the particular end use application. The fabric material can also contain a woven fabric, a nonwoven fabric, a knitted fabric, a film, and combinations thereof. In general, a woven fabric may include warp yarns woven together with fill yarns. The warp yarns extend in the warp direction or length direction. The fill yarns, on the other hand, extend in the fill direction or the width direction.

Each yarn can include a single end or can include two ends. Optionally, the yarns can be textured. In such yarns, the filaments are distorted from their generally rectilinear condition to increase the bulk of the yarn and also to provide an ability for a fabric woven therefrom to stretch. A textured yarn may be "set" by heat relaxation to minimize its stretch characteristic, while maintaining its increased bulk, i.e., higher bulked denier.

There are several types of textured yarns capable of being produced by various methods. Different types of textured yarns have different characteristics, some being more expensive than others. The textured yarns that may be employed in the present fabric constructions, or referenced herein, are:

(1) False twist yarn is twisted in one direction, set, then twisted in the opposite direction and set. The twisting, setting, opposite twisting are repeated throughout the length of the yarn.

(2) Core and effect yarn (also known as "core bulked" yarns) is a multiple ended yarn, usually comprising two ends in which one end is essentially straight. The filaments of other end are distorted around the core end and sometimes through the core end.

(3) Air texturized core and effect yarn—is a core and effect yarn in which distortion of the filaments is done by air jet means. An air texturized core and effect yarn has unique properties which distinguish it from other textured yarns. These unique properties have been found effective in attaining the ends herein sought.

The fabric material of the present disclosure can also be calendered. Calendering can increase the barrier properties and reduce the permeability of the fabric. During calendering, the fabric is passed between a pair of pressure rolls wherein at least one of the rolls is heated. When a woven polyester fabric is calendered, the fabric is compressed and its density is increased as the interstices between the yarns and the filaments of the yarns are decreased.

In one embodiment, fabric material may be used to construct a garment worn by firefighters. For instance, referring to FIG. 1, one embodiment of a fireman turnout coat 10 constructed in accordance with the present disclosure is illustrated. Garment 10 includes a relatively tough outer shell 12 having a liner assembly 14 located therein. Outer shell 12 and liner assembly 14 together function to protect a wearer from heat and flame such as may be encountered during firefighting activities.

In the illustrated embodiment, liner assembly 14 is constructed as a separate unit that may be removed from outer shell 12. A zipper 16 is provided for removably securing liner assembly 14 to outer shell 12. It should be appreciated, however, that other suitable means of attachment, including a more permanent type of attachment such as stitches, may also be used between liner assembly 14 and outer shell 12.

Figure 2:
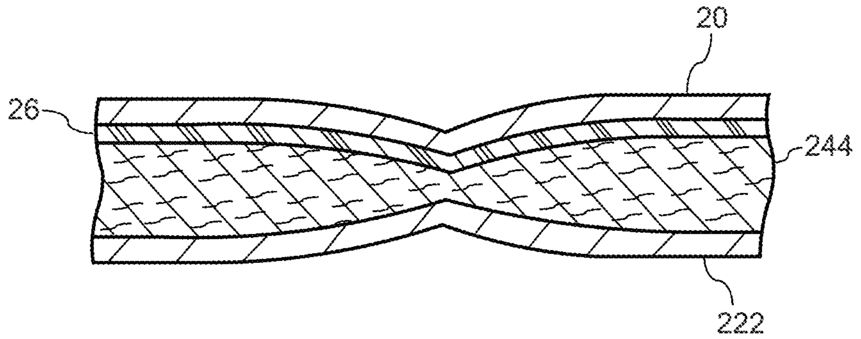
FIG. 2 is a cross-sectional view of an inner liner that may be incorporated into the garment illustrated in FIG. 1.

The construction of protective garment 10 is more particularly illustrated in FIG. 2. As shown, liner assembly 14 includes a plurality of material layers quilted together. The outermost layers, i.e. lining layers 20 and 22, are connected together about their respective peripheries to form an inner cavity. A thermal barrier layer 24 and a moisture barrier layer 26 are located within the inner cavity, as shown. Typically, lining layer 20 will be adjacent the wearers body during use, whereas lining layer 22 will be adjacent outer shell 12.

Thermal barrier layer 24 can be made from various materials. For instance, an aramid felt, such as a felt produced from NOMEX meta-aramid fibers obtained from DuPont can be used. The felt functions as an insulator to inhibit transfer of heat from the ambient-environment to the wearer.

Moisture barrier 26 is preferably a suitable polymeric membrane that is impermeable to liquid water but is permeable to water vapor. Moisture barrier layer 26 is designed to prevent water contacting the exterior surface of garment 10 from reaching the wearer while at the same time permitting the escape of perspiration from the wearer.

In the embodiment described above, the fireman turnout coat 10 includes multiple layers. In other embodiments, however, it should be understood that a coat or jacket treated in accordance with the present disclosure may include a single layer or may include an outer shell attached to a liner. For example, wildland firefighter garments are typically one or two layers.

Figure 4:
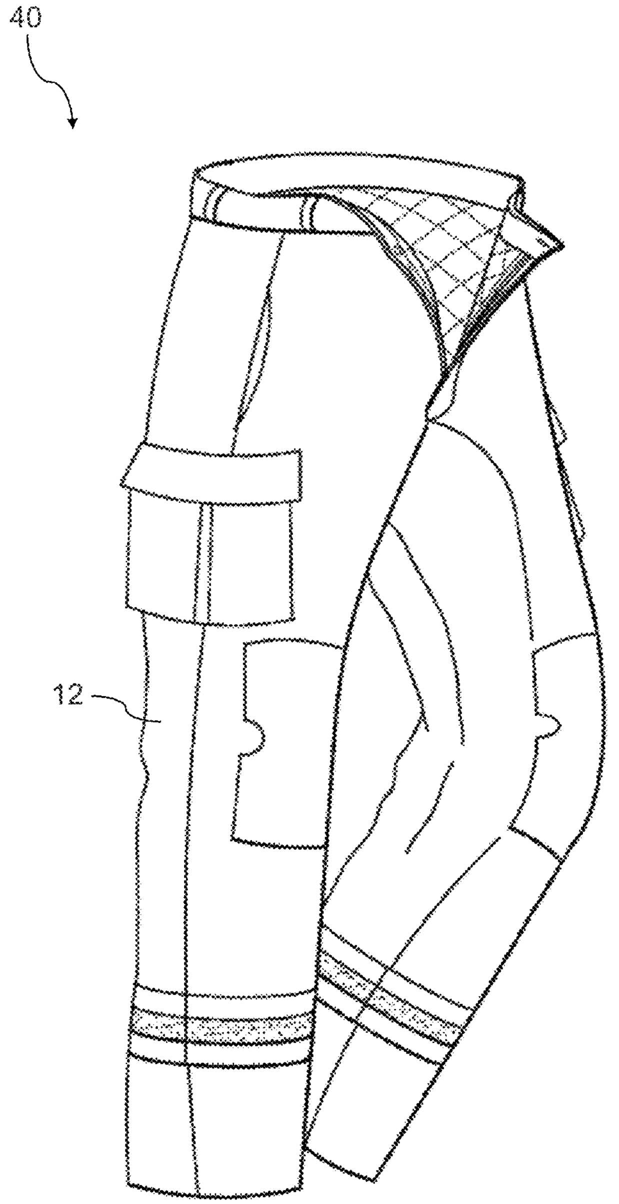
FIG. 4 is a perspective view of one embodiment of a protective garment comprising trousers made in accordance with the present disclosure.

Referring to FIG. 4, a pair of trousers treated in accordance with the present disclosure is shown. The trousers 40 as shown in FIG. 4 can be used in conjunction with the turnout coat 10 illustrated in FIG. 1. The trousers 40 also include an outer shell 12 made from the fabric material of the present disclosure.

Any of the fabric layers illustrated in the figures can be treated in accordance with the present disclosure. For instance, the outer shell 12, the lining layer 20, the lining layer 22, and/or the thermal barrier layer 24 as shown in FIGS. 1 and 2 can be treated in accordance with the present disclosure with a fluid resistant treatment that is free of fluorocarbon chemicals. The fabric material can be a woven or knitted fabric and, in one embodiment, contains inherently flame resistant fibers. For example, the fabric material can contain inherently flame resistant fibers in an amount greater than about 50% by weight, such as in an amount greater than about 60% by weight, such as in an amount greater than about 70% by weight, such as in an amount greater than about 80% by weight, such as in an amount greater than about 90% by weight, such as in an amount greater than about 95% by weight. In one embodiment, for instance, the fabric material is made exclusively from inherently flame resistant fibers or contains inherently flame resistant fibers in an amount up to about 97% by weight, such as about 98% by weight. The inherently flame resistant fibers can include, for instance, aramid fibers such as para-aramid fibers and/or meta-aramid fibers. Other inherently flame resistant fibers include polybenzimidazole (PBI) fibers or poly(p-phenylene-2,6-bezobisoxazole) (PBO fibers) and the like. In one embodiment, for instance, the fabric material only contains aramid fibers such as para-aramid fibers alone or in combination with meta-aramid fibers. In still another embodiment, the fabric material contains only meta-aramid fibers. In still another embodiment, the fabric material contains aramid fibers in combination with PBI fibers. The PBI fibers can be present in the fabric material, for instance, in an amount greater than about 20% by weight, such as in an amount greater than about 25% by weight, such as in an amount greater than about 30% by weight, such as in an amount greater than about 35% by weight, such as in an amount greater than about 40% by weight, such as in an amount greater than about 45% by weight, such as in an amount greater than about 50% by weight, and generally in an amount less than about 70% by weight, such as in an amount less than about 60% by weight.

In addition to any of the inherently flame resistant fibers described above, the fabric material may contain other fibers. For instance, the fabric material may also include fibers treated with a flame retardant such as FR cellulose fibers including FR viscose fibers and FR rayon fibers. In addition, the fabric material may include antistatic fibers, nylon fibers, and the like. For example, a fabric materials treated in accordance with the present disclosure can contain nylon fibers in an amount up to about 20% by weight. For instance, nylon fibers can be present in an amount of from about 18% to about 2% by weight, such as from about 15% to about 8% by weight.

The yarns used to produce the fabric material can vary depending upon the particular application and the desired result. In one embodiment, for instance, the fabric material may contain only spun yarns, may contain only filament yarns, or may contain both spun yarns and filament yarns. The number ratio between spun yarns and filament yarns, for instance, can be from about 1:1 to about 10:1. For example, in one embodiment, the fabric material may contain spun yarns to filament yarns in a number ratio of from about 2:1 to about 4:1. When the fabric material is a woven fabric, the fabric can have any suitable weave such as a plain weave, a twill weave, a rip stop weave, or the like.

In one embodiment, the filament yarns may be made from an inherently flame resistant material. For example, the filament yarns may be made from an aramid filament, such as a para-aramid or a meta-aramid filament.

In other embodiments, the filament yarns may be made from other flame resistant materials. For instance, the filament yarns may be made from poly-p-phenylenebenzobisoxazole fibers (PBO fibers), and/or FR cellulose fibers, such as FR viscose filament fibers.

The filament yarns can be combined with spun yarns. Alternatively, the fabric material can be made using only filament yarns or only spun yarns. In accordance with the present disclosure, the spun yarns, in one embodiment, may contain polybenzimidazole fibers alone or in combination with other fibers. For example, in one embodiment, the spun yarns may contain polybenzimidazole fibers in combination with aramid fibers, such as para-aramid fibers, meta-aramid fibers, or mixtures thereof.

Instead of or in addition to containing polybenzimidazole fibers, the spun yarns may contain aramid fibers as described above, modacrylic fibers, peroxidized carbon fibers, melamine fibers, polyamide imide fibers, polyimide fibers, and mixtures thereof.

In one particular embodiment, the spun yarns contain polybenzimidazole fibers in an amount greater than about 30% by weight, such as in an amount greater than about 40% by weight. The polybenzimidazole fibers may be present in the spun yarns in an amount less than about 60% by weight, such as in an amount less than about 55% by weight. The remainder of the fibers, on the other hand, may comprise para-aramid fibers.

In one embodiment, various other fibers may be present in the spun yarns. When the fabric is used to produce turnout coats for firemen, the spun yarns can be made exclusively from inherently flame resistant fibers. When the fabric is being used in other applications, however, various other fibers may be present in the spun yarns. For instance, the spun yarns may contain fibers treated with a fire retardant, such as FR cellulose fibers. Such fibers can include FR cotton, FR rayon, FR acetate, FR triacetate, FR lyocell, and the like. The spun yarns may also contain nylon fibers if desired, such as antistatic fibers.

In one aspect, the fabric treated with the fluid resistant treatment may comprise an outer shell material. The weight of the outer shell material can vary depending upon the particular type of protective garment being produced. The weight of the outer shell material, for instance, is generally greater than about 4 ounces per square yard, such as greater than about 5 ounces per square yard, such as greater than about 5.5 ounces per square yard, such as greater than about 6 ounces per square yard and generally less than about 8.5 ounces per square yard, such as less than about 8 ounces per square yard, such as less than about 7.5 ounces per square yard.

In another aspect, the fabric material treated in accordance with the present disclosure is a liner fabric. The liner fabric, for instance, can be positioned adjacent to the wearer's body during use. The lining fabric can be made from a combination of spun yarns and filament yarns as described above. The filament yarns can have a size of greater than about 100 denier, such as greater than about 200 denier, and less than about 500 denier, such as less than about 400 denier. In order to increase the lubricity of the liner fabric, the spun yarns and filament yarns can be woven together such that the filament yarns comprise more than about 50% of the surface area of one side of the fabric. For instance, the filament yarns may comprise greater than about 60%, such as greater than about 70%, such as greater than about 80% of one side of the fabric. The side of the fabric with more exposed filament yarns is then used as the interior face of the garment. The filament yarns provide a fabric with high lubricity characteristics that facilitates donning of the garment. For example, the lining fabric can be woven together using a twill weave, such as a 2×1 or 3×1 weave. The lining fabric can have a basis weight of less than about 5 ounces per square yard, such as less than about 4 ounces per square yard, and generally greater than about 2.5 ounces per square yard, such as greater than about 3 ounces per square yard.

In another aspect, the fabric material treated in accordance with the present disclosure is the barrier layer 24 as shown in FIG. 2. Barrier layer 24, for instance, can comprise a batting material, such as a felt. Once treated, the layer 24 can have the same characteristics as described above with respect to spray rating and water absorption.

The present disclosure may be better understood with reference to the following examples.

EXAMPLES

Example 1

Various different fabric samples were treated with a fluid resistant treatment formed in accordance with the present disclosure and tested for their respective properties.

The following fabrics were tested:

A style 90575 PBI MAX Gold 7.0 Oz fabric made of 52% PBI/48% Para-aramid (one yard samples).

All laundry cycles performed in the Examples are in accordance with NFPA 1971, 8-1.2.

The formulation of the fluid resistant treatment utilized to treat the samples (i.e., Samples 1-6) of Table 2 is displayed in Table 1. As observed in Table 2, the fabric samples of Style 90575 were tested in accordance with EN ISO 6530 for their index of penetration, index of repellency, and index of absorption when contacted with hydraulic fluid. The hydraulic fluid was a mixture of 70-99% high refined mineral oils ($C_{15}$-$C_{50}$).

TABLE 1

| Fluid Resistant Treatment | |
|---|---|
| Component | Formulation [wt. %] |
| Water (Aqueous Composition) | 66.5 |
| Silicone-Containing Polymer (Oil Resistant Composition) | 16.0 |
| Acrylic Emulsion (Water Resistant Composition) | 12.0 |
| Polyurethane Polymer (Cross-linking Agent) | 5.0 |
| Isopropyl Alcohol (Wetting Agent) | 0.5 |

TABLE 2

| Sample | Number of Laundry Cycles | Index of Penetration | Index of Repellency | Index of Absorption |
|---|---|---|---|---|
| 1 | 0x | 1.19 | 82.89 | 5.93 |
| 2 | 0x | 2.02 | 92.49 | 7.00 |

The formulation of the fluid resistant treatment of Table 4 is displayed in Table 3. The formulation did not contain a silicone-containing polymer. As observed in Table 4, the fabric samples of Style 90575 were tested in accordance with EN ISO 6530 for their index of penetration, index of repellency, and index of absorption when contacted with hydraulic fluid. The hydraulic fluid was a mixture of 70-99% high refined mineral oils ($C_{15}$-$C_{50}$).

TABLE 3

| Fluid Resistant Treatment | |
|---|---|
| Component | Formulation [wt. %] |
| Water (Aqueous Composition) | 63.36 |
| Dispersion of Paraffin Wax and Acrylic Polymer (Water Resistant Composition) | 18.18 |
| Polyurethane Polymer Binder) | 6.53 |
| Modified Polyurethane Polymer (Cross-linking agent) | 6.42 |
| Polyalkylene Polymer (Softener) | 3.96 |
| Isopropyl Alcohol (Wetting Agent) | 1.56 |

TABLE 4

| Sample | Number of Laundry Cycles | Index of Penetration | Index of Repellency | Index of Absorption |
|---|---|---|---|---|
| 3 | 0x | 7.71 | 73.99 | 18.14 |
| 4 | 0x | 9.60 | 69.96 | 20.99 |

As observed in Table 4, fabric samples of Tencate Kombat Flex were tested in accordance with EN ISO 6530 for their index of penetration, index of repellency, and index of absorption when contacted with hydraulic fluid. The hydraulic fluid was a mixture of 70-99% high refined mineral oils ($C_{15}$-$C_{50}$).

TABLE 5

| Sample | Number of Laundry Cycles | Index of Penetration | Index of Repellency | Index of Absorption |
|---|---|---|---|---|
| 5 | 0x | 14.58 | 64.39 | 23.83 |
| 6 | 0x | 13.87 | 64.51 | 23.24 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. A protective garment comprising:

a fabric material comprising a woven fabric, a knitted fabric, a nonwoven fabric, or a combination thereof, the fabric material comprising inherently flame resistant fibers in an amount greater than about 70 wt. %, the inherently flame resistant fibers being selected from at least one of para-aramid fibers, meta-aramid fibers, and polybenzimidazole fibers;

the fabric material being treated with a fluid resistant treatment, the fluid resistant treatment impregnating the fabric material, the fluid resistant treatment being substantially fluorocarbon free, the fluid resistant treatment comprising:

a water resistant composition;

an oil resistant composition, the oil resistant composition comprising a silicone-containing polymer;

one or more wetting agents, the one or more wetting agents and the oil resistant composition being present in the fluid resistant treatment in a weight ratio of about 1:5 to about 1:45; and one or more cross-linking agents, the one or more cross-linking agents and the oil resistant composition being present in the fluid resistant treatment in a weight ratio of about 1:1 to about 1:8.

2. The protective garment as defined in claim 1, wherein the water resistant composition is present in the fluid resistant treatment in an amount from about 0.05 wt. % to about 40 wt. %.

3. The protective garment as defined in claim 1, wherein the water resistant composition comprises an acrylic emulsion.

4. The protective garment as defined in claim 1, wherein the water resistant composition is substantially fluorocarbon free.

5. The protective garment as defined in claim 1, wherein the oil resistant composition is present in the fluid resistant treatment in an amount from about 0.05 wt. % to about 40 wt. %.

6. The protective garment as defined in claim 1, wherein the oil resistant composition has a pH of from about 2 to about 8.

7. The protective garment as defined in claim 1, wherein the oil resistant composition is substantially fluorocarbon free.

8. The protective garment as defined in claim 1, wherein the one or more wetting agents comprise isopropyl alcohol.

9. The protective garment as defined in claim 1, wherein the one or more cross-linking agents comprise a polyurethane.

10. The protective garment as defined in claim 1, wherein the water resistant composition and the one or more wetting agents are present in the fluid resistant treatment in a weight ratio of about 4:1 to about 40:1.

11. The protective garment as defined in claim 1, wherein the water resistant composition and the one or more cross-linking agents are present in the fluid resistant treatment in a weight ratio of about 1:2 to about 15:1.

12. The protective garment as defined in claim 1, wherein the water resistant composition and the oil resistant composition are present in the fluid resistant treatment in a weight ratio of about 1:10 to about 10:1.

13. The protective garment as defined in claim 1, wherein the oil resistant composition comprises a cationically stabilized silicone-containing polymer.

14. The protective garment as defined in claim 1, wherein the oil resistant composition comprises one or more pendant groups having the following structure:

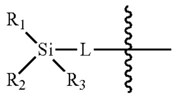

wherein, each of $R_1$, $R_2$, and $R_5$ are independently alkyl groups, alkoxy groups, aryl groups, hydroxyl groups, halogen groups, —O—SiR' groups, or —O—SiOR' groups, wherein R' groups are independently chosen from alkyl groups and/or aryl groups;

wherein each L is a linking group comprising a —O— group, a $—CH_2—$ group, a $—(CH_2)_2—$ group, a $—(CH_2)_3—$ group, a $—Si(CH_3)_2O—$ group, a $—OSi(CH_3)_2O—$ group, a $—CH_2CH_3O—$ group, a $—OSi(CH_2CH_3)_2O—$ group, a $—CH_2O—$ group, a $—(CH_2)_2O—$ group, a $—CH_2C{=}O—$ group, a —OC═ONH— group, a $—CH_2N—$ group, a $—CH_2SO_2—$ group, a

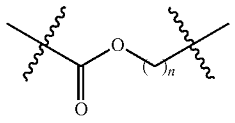

group, a

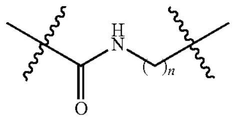

group, or a

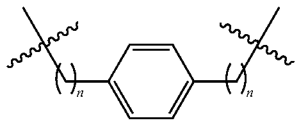

group, where n is a value from 0 to 40.

15. The protective garment as defined in claim 1, wherein the oil resistant composition comprises one or more pendant groups having the following structure:

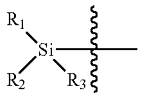

wherein, each of $R_1$, $R_2$, and $R_5$ are independently alkyl groups, alkoxy groups, aryl groups, hydroxyl groups, halogen groups, —O—SiR' groups, —O—SiOR' groups, or combinations thereof, wherein R' groups are independently chosen from alkyl groups and/or aryl groups.

16. The protective garment as defined in claim 1, wherein the protective garment comprises a fire service garment.

17. The protective garment as defined in claim 1, wherein the treated fabric material comprises fluorine in an amount greater than about 0 ppm.

18. The protective garment as defined in claim 17, wherein the silicone-containing polymer has a hydroxyl value from about 5 mg KOH/g to about 150 mg KOH/g.

19. The protective garment as defined in claim 1, wherein:

the mass concentration of the one or more cross-linking agents in the fluid resistant treatment is from about 0.2% to about 8%;

the mass concentration of the one or more wetting agents in the fluid resistant treatment is from about 0.05% to about 5%;

the one or more wetting agents and the oil resistant composition are present in the fluid resistant treatment in a weight ratio of about 1:5 to about 1:35; and the one or more cross-linking agents and the oil resistant composition are present in the fluid resistant treatment in a weight ratio of about 1:1 to about 1:6.

* * * * *